(12) United States Patent
Maruyama

(10) Patent No.: US 12,441,036 B2
(45) Date of Patent: Oct. 14, 2025

(54) INJECTION MOLDING SYSTEM AND MANUFACTURING SYSTEM

(71) Applicant: Seiko Epson Corporation, Tokyo (JP)

(72) Inventor: Hidenobu Maruyama, Azumino (JP)

(73) Assignee: SEIKO EPSON CORPORATION (JP)

( * ) Notice: Subject to any disclaimer, the term of this patent is extended or adjusted under 35 U.S.C. 154(b) by 557 days.

(21) Appl. No.: 17/750,502

(22) Filed: May 23, 2022

(65) Prior Publication Data

US 2022/0371239 A1    Nov. 24, 2022

(30) Foreign Application Priority Data

May 24, 2021   (JP) .................. 2021-086946

(51) Int. Cl.
| | | |
|---|---|---|
| *B29C 45/14* | (2006.01) | |
| *B29C 45/03* | (2006.01) | |
| *B29C 45/17* | (2006.01) | |
| *B29C 45/40* | (2006.01) | |
| *B29C 45/47* | (2006.01) | |
| *B29C 45/64* | (2006.01) | |

(Continued)

(52) U.S. Cl.
CPC ........ *B29C 45/14008* (2013.01); *B29C 45/03* (2013.01); *B29C 45/1418* (2013.01); *B29C 45/1756* (2013.01); *B29C 45/40* (2013.01); *B29C 45/47* (2013.01); *B29C 45/64* (2013.01); *B29C 45/72* (2013.01); *B29C 45/76* (2013.01); *B29C 2945/76167* (2013.01); *B29C 2945/76294* (2013.01); *B29K 2705/00* (2013.01)

(58) Field of Classification Search
CPC ........................ B29C 45/42; B29C 45/0084
See application file for complete search history.

(56) References Cited

U.S. PATENT DOCUMENTS

| 10,836,086 B2 | 11/2020 | Watanabe et al. |
| 2017/0136671 A1* | 5/2017 | Uchiyama ............ B29C 45/768 |

(Continued)

FOREIGN PATENT DOCUMENTS

| CN | 212147406 U | 12/2020 |
| CN | 213035138 U | 4/2021 |

(Continued)

*Primary Examiner* — Jacob T Minskey
*Assistant Examiner* — Irak Nguon
(74) *Attorney, Agent, or Firm* — Harness, Dickey & Pierce, P.L.C.

(57) ABSTRACT

An injection molding unit includes a main unit and an optional unit, the main unit accommodating a first injection molding machine that molds an integrated product by injecting a first molding material into a cavity which is defined by a lower die and an upper die and in which an insert member is disposed. The optional unit includes at least one of a member molding unit that accommodates a second injection molding machine that molds the insert member by injecting a second molding material or a press molding machine that molds the insert member in press molding, and a robot unit that accommodates a robot that performs placement operation of placing the insert member in the cavity or transport operation of transporting the integrated product molded by the first injection molding machine. The main unit is so configured that the optional unit is attachable thereto and detachable therefrom.

11 Claims, 23 Drawing Sheets

(51) Int. Cl.
  *B29C 45/72*    (2006.01)
  *B29C 45/76*    (2006.01)
  *B29K 705/00*   (2006.01)

(56) References Cited

U.S. PATENT DOCUMENTS

2019/0358903 A1 * 11/2019 Watanabe ............... B22F 10/22
2020/0055219 A1    2/2020 Watanabe et al.

FOREIGN PATENT DOCUMENTS

| DE | 102015207704 A1 * | 10/2016 | ......... B29C 45/0408 |
|---|---|---|---|
| EP | 1876004 A1 * | 1/2008 | ......... B29C 45/0084 |
| JP | H0737055 B2 * | 4/1995 | |
| JP | 2014-079947 A | 5/2014 | |
| JP | 2017-087689 A | 5/2017 | |
| JP | 2019-209665 A | 12/2019 | |
| JP | 2020-028975 A | 2/2020 | |
| PH | 12019000190 A1 | 1/2020 | |

* cited by examiner

INJECTION MOLDING SYSTEM AND MANUFACTURING SYSTEM

The present application is based on, and claims priority from JP Application Serial Number 2021-086946, filed May 24, 2021, the disclosure of which is hereby incorporated by reference herein in its entirety.

BACKGROUND

1. Technical Field

The present disclosure relates to an injection molding system and a manufacturing system.

2. Related Art

Regarding injection molding systems, JP-A-2017-87689 discloses a system including a plurality of molding cells coupled to a management apparatus via a network. The molding cells each include an injection molding machine, a temperature adjuster that adjusts the temperature of the die, an imaging device that captures an image of a molded product, and a robot that removes the molded product. The configuration of each of the molding cells is customizable and can, for example, be a configuration including a molded product removal apparatus instead of the robot, a configuration including a molded product measurement apparatus, or a configuration with no molded product imaging device.

JP-A-2017-87689 describes that the apparatuses that form the molding cell are coupled to each other via a communication line, but does not particularly mention the physical arrangement of the apparatuses. It has been required in recent years to downsize manufacturing facilities, and there is a need for a technology that can achieve a space-saving injection molding system including a plurality of injection-molding-related apparatuses with the degree of freedom of the customization of the system increased, as described above.

SUMMARY

According to a first aspect of the present disclosure, there is provided an injection molding unit. The injection molding unit includes a main unit and an optional unit, the main unit accommodating a first injection molding machine that molds an integrated product by injecting a first molding material into a cavity which is defined by a lower die and an upper die and in which an insert member is disposed. The optional unit includes at least one of a member molding unit that accommodates a second injection molding machine that molds the insert member by injecting a second molding material or a press molding machine that molds the insert member in press molding, and a robot unit that accommodates a robot that performs placement operation of placing the insert member in the cavity or transport operation of transporting the integrated product molded by the first injection molding machine. The main unit is so configured that the optional unit is attachable thereto and detachable therefrom.

According to a second aspect of the present disclosure, there is provided a manufacturing system. The manufacturing system includes one or more of the injection molding systems according to the aspect described above, an assembly line that assembles final products each using the integrated product, and transfer sections that transfer the integrated products from the injection molding systems to the assembly line.

DESCRIPTION OF EXEMPLARY EMBODIMENTS

A. First Embodiment

Figure 1:
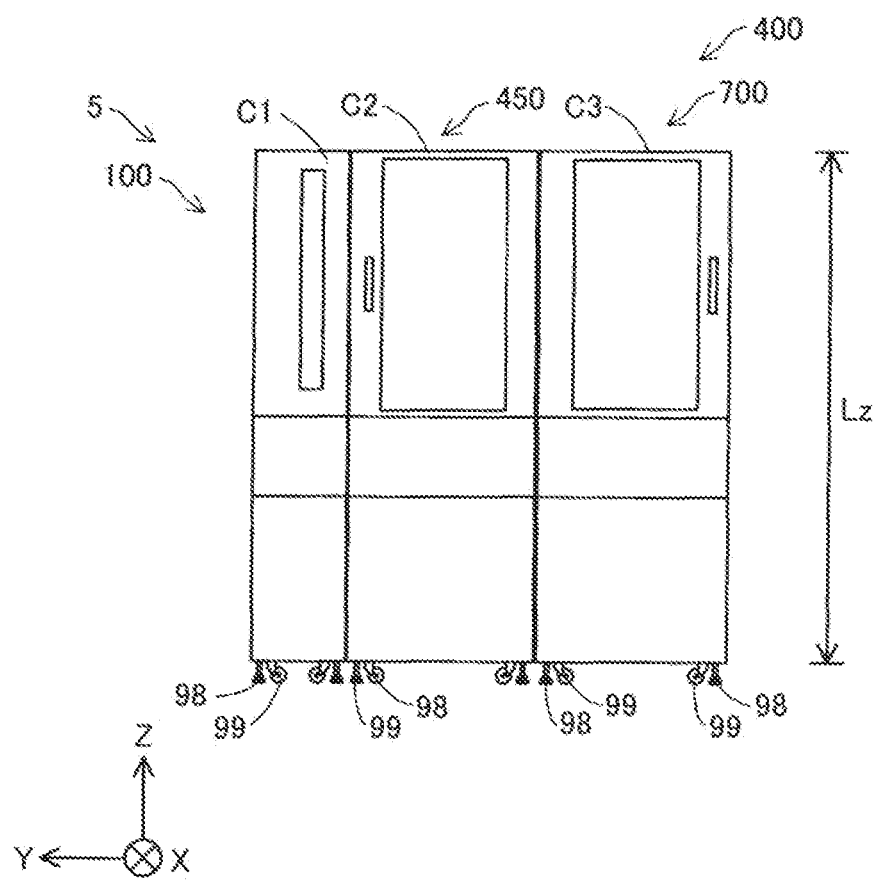
FIG. 1 is a front view showing a schematic configuration of an injection molding system according to a first embodiment.
Figure 2:
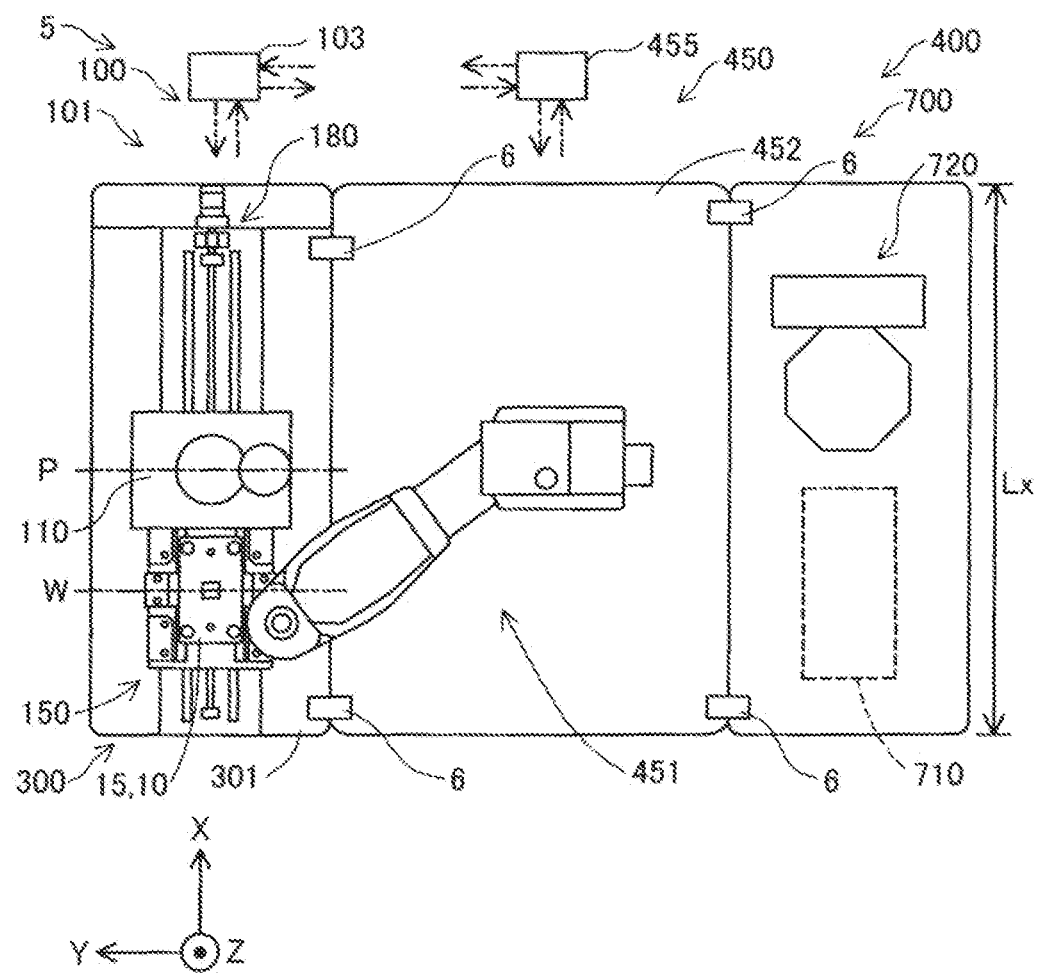
FIG. 2 is a plan view showing the schematic configuration of the injection molding system according to the first embodiment.

FIG. 1 is a front view showing a schematic configuration of an injection molding system 5 according to a first embodiment. FIG. 2 is a plan view showing the schematic configuration of the injection molding system 5 according to the first embodiment. FIGS. 1 and 2 show arrows along directions X, Y, and Z perpendicular to one another. The directions X, Y, and Z are directions along axes X, Y, and Z, which are three spatial axes perpendicular to one another, and each include both a direction toward one side of the corresponding one of the axes X, Y, and Z and the direction opposite the direction toward the one side. The axes X and Y are axes along the horizontal plane, and the axis Z is an axis along a vertical line. The direction −Z is the vertical direction, and the direction +Z is the direction opposite to the vertical direction. The direction −Z is also referred to as "lower", and the direction +Z is also referred to as "upper". The other figures also show the arrows along the directions X, Y, and Z as appropriate. The directions X, Y, and Z in FIGS. 1 and 2 and the directions X, Y, and Z in the other figures represent the same directions.

The injection molding system 5 includes a main unit 100 and an optional unit 400. In the present embodiment, the optional unit 400 includes a robot unit 450 and an ancillary instrument unit 700. In the present embodiment, the robot unit 450 is disposed in a position adjacent to the main unit 100 in the direction −Y. The ancillary instrument unit 700 is disposed in a position adjacent to the robot unit 450 in the direction −Y. In the following description, when units provided in the optional unit 400 are not particularly distinguished from one another, the units are also simply called the optional unit 400 in some cases. That is, in the present embodiment, the robot unit 450 and the ancillary instrument unit 700 are not distinguished from each other and are also collectively simply called the optional unit 400 in some cases.

The main unit 100 is so configured that the optional unit 400 is attachable thereto and detachable therefrom. In the present embodiment, the robot unit 450 and the ancillary instrument unit 700 are attachable to and detachable from the main unit 100. In the present embodiment, plate-shaped members 6 for coupling purposes extend in the form of bridges between the main unit 100 and the robot unit 450, and the plate-shaped members 6 are fastened to the main unit 100 and the robot unit 450 with bolts, so that the robot unit 450 is detachably coupled to the main unit 100, as shown in FIG. 2. The ancillary instrument unit 700 is detachably coupled to the main unit 100 because pipes and wiring lines that are not shown but are provided in the ancillary instrument unit 700 are coupled to the main unit 100. The ancillary instrument unit 700 and the robot unit 450 are coupled to each other via other plate-shaped members 6, as the main unit 100 and the robot unit 450 are. The coupling that allows the optional unit 400 to be detachably coupled to the main unit 100 is not necessarily achieved by the bolts and pipes described above, and may instead be clamps or other fasteners or a variety of types of metal fittings.

The main unit 100 and the ancillary instrument unit 700 can instead be linked to each other via the plate-shaped members 6 when the two units are adjacent to each other. For example, the ancillary instrument unit 700 may be disposed in a position shifted in the direction +Y from the main unit 100 and linked to the main unit 100. On the other hand, the present embodiment, in which the optional unit 400 is not linked to the main unit 100 in a position shifted in the direction +Y but the main unit 100 is located at the +Y-direction end of the injection molding system 5, allows the main unit 100 to be readily maintained from the +Y-direction side of the main unit 100 with no movement of the units, whereby the main unit 100 is maintained in an improved manner.

In the present embodiment, the dimensions of the units in the direction X are unified, and so are the dimensions of the units in the direction Z. In more detail, the dimensions of enclosures of the main unit 100 and the optional unit 400 in the direction X are unified into a dimension Lx, as shown in FIG. 2, and the dimensions of the enclosures in the direction Z are unified into a dimension Lz, as shown in FIG. 1. Therefore, when the units are arranged along the direction Y as in the present embodiment, a situation in which a certain unit protrudes more than the others in the directions X and Z is avoided. Therefore, for example, when the units are rearranged, any change in the shape of the outer edge of the main unit 100 and the optional unit 400 as a whole in the directions X and Z is avoided, whereby the possibility of restriction on the arrangement of the units due to the space where the units are installed is lowered. Furthermore for example, when a unit provided in the optional unit 400 is replaced with another unit or a new unit is added to the optional unit 400, the possibility of restriction on the arrangement of the units in the directions X and Z due to the space where the units are installed is lowered. The configuration described above improves the flexibility of the arrangement of the units in the injection molding system 5 and the selection of the optional unit 400.

The enclosures of the main unit 100 and the optional unit 400 each include wheels 99, as shown in FIG. 1. In a state in which the main unit 100 and the optional unit 400 are not linked to each other, the units are movable independently of each other. A bolt-shaped stopper 98 is provided in the vicinity of each of the wheels 99 of each of the units. A user can use the stoppers 98 to fix the units or the injection molding system 5 at any installation location.

The main unit 100, the robot unit 450, and the circumference of the ancillary instrument unit 700 are each covered by a first cover C1 to a third cover C3, respectively, as shown in FIG. 1. The covers prevent dust and other types of foreign matter from entering the injection molding system 5. At least part of the covers may be made, for example, of transparent glass or resin, so that the working conditions inside the covers can be visually recognized from outside. The covers may each be provided, for example, with a door for maintenance or an opening for ventilation. FIG. 2 is a top view showing the injection molding system 5 with the covers of the units removed.

A first injection molding machine 101 is disposed in the main unit 100, as shown in FIG. 2. A robot 451 is disposed in the robot unit 450. A die temperature adjuster 710 and a material feeder 720 are disposed in the ancillary instrument unit 700.

Figure 3:
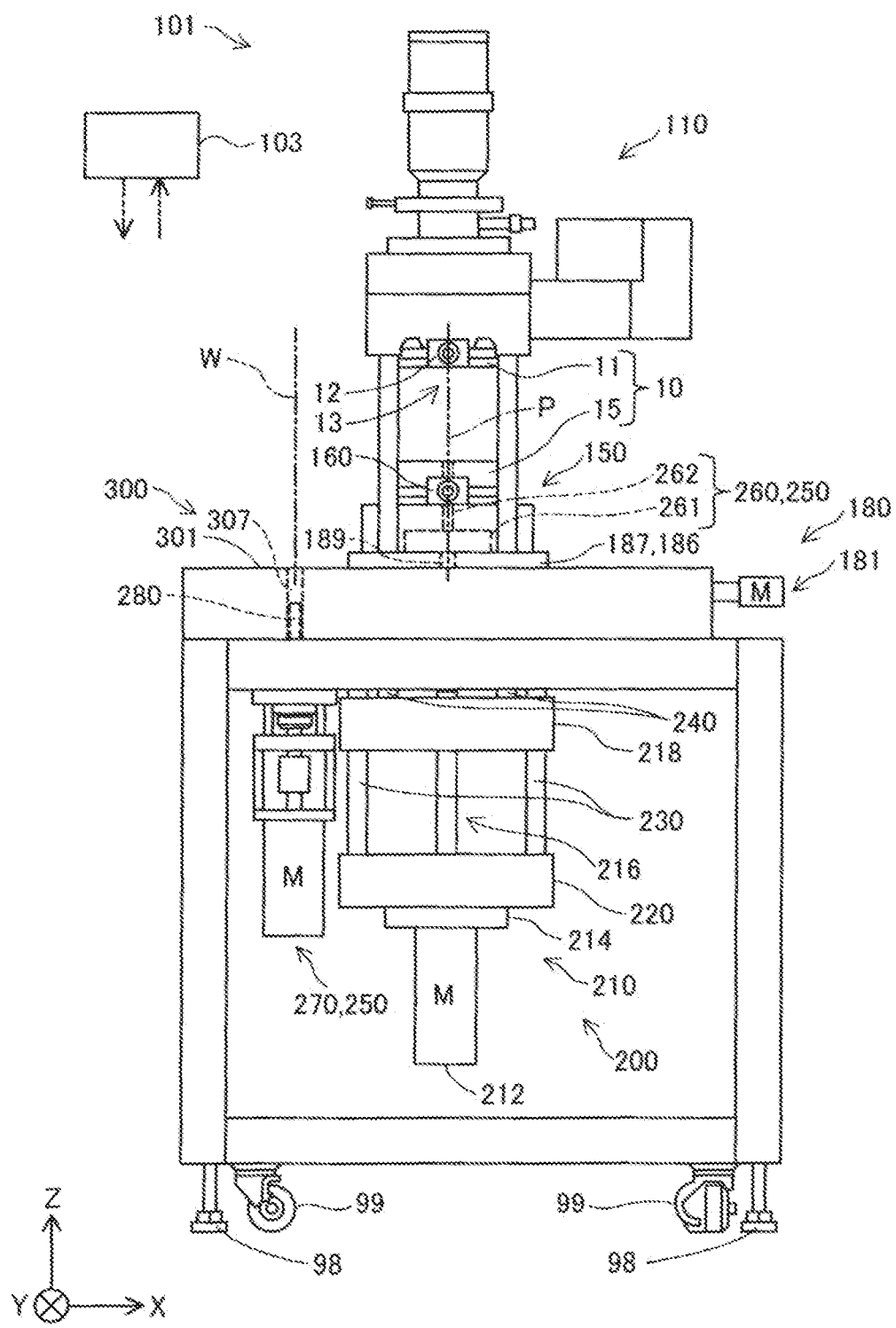
FIG. 3 is a first view showing a schematic configuration of a first injection molding machine in the first embodiment.

FIG. 3 is a first view showing a schematic configuration of the first injection molding machine 101 in the first embodiment. The first injection molding machine 101 in the present embodiment includes a first controller 103, an injector 110, a lower die support 150, a position changer 180, a die clamper 200, an ejector 250, and a base 300. The base 300 is fixed to the enclosure of the main unit 100.

The first injection molding machine 101 is so configured that a molding die 10 is installable therein. The molding die 10 includes an upper die 11 and a lower die 15. The upper die 11 and the lower die 15 define a cavity that is a space according to the shape of a molded product. More specifically, the lower surface of the upper die 11 and the upper surface of the lower die 15 are provided with a protrusion and a recess that define the cavity, and when the upper die 11 and the lower die 15 are clamped, a cavity having the shape according to the protrusion and the recess is defined between the upper die 11 and the lower die 15. The molding die 10 may be made, for example, of metal, resin, or ceramic. The metal molding die 10 is called a die in some cases.

The molding die 10 is installed in the first injection molding machine 101 with the molding die 10 supported by a support of the first injection molding machine 101. In the present embodiment, the support refers to an upper die support 13, which supports the upper die 11, and the lower die support 150, which supports the lower die 15. The upper die support 13 is configured as a holder fixed to a lower portion of the injector 110 and including upper die clamps 12, which fix the upper die 11 by sandwiching the upper die 11 in the direction Y. The lower die support 150 is configured as a holder provided below the upper die support 13 and including lower die clamps 160, which fix the lower die 15 by sandwiching the lower die 15 in the direction Y. FIGS. 2 and 3, and the other figures that will be described later show the state in which the molding die 10 is installed in the first injection molding machine 101 unless otherwise noted.

In the present embodiment, in the state in which the molding die 10 is supported by the support, that is, in the state in which the upper die 11 is supported by the upper die support 13 and the lower die 15 is supported by the lower die support 150, the upper die 11 is located below the injector 110 and the lower die 15 is located below the upper die 11, as shown in FIG. 3. That is, in the state in which the molding die 10 is supported by the support, the injector 110, the upper die 11, and the lower die 15 are arranged sequentially from above in the vertical direction. In the present embodiment, the upper die 11 and the lower die 15 are both disposed above the base 300 in the state in which the molding die 10 is supported by the support.

The first injection molding machine 101 is configured as an injection molding machine that performs insert molding. The insert molding is one of the approaches for molding a molded product in injection molding and refers to an approach for injecting a molding material into the cavity of the molding die 10 in which an insert member is placed to mold, as the molded product, an integrated product formed of the insert member and the injected molding material integrated with each other. In the present embodiment, the insert member is placed in the lower die 15 and therefore placed in the cavity of the molding die 10. The insert member may be made, for example, of metal or resin. The molding material injected by the first injection molding machine 101 is called a first molding material in some cases.

The first controller 103 is formed of a computer including one or more processors, a primary storage device, and an input/output interface via which signals are inputted from and outputted to an external apparatus. The processor reads a program onto the primary storage device and executes the program, so that the first controller 103 in the present embodiment performs the function of controlling the injector 110 and the die clamper 200 of the first injection molding machine 101 to shape an integrated product and the function of controlling a variety of apparatuses and other components provided in the optional unit 400 to oversee and control the entire injection molding system 5.

The die clamper 200 in the present embodiment is configured to be capable of clamping and opening the molding die 10 by moving the injector 110 and the upper die 11 along the direction Z with the molding die 10 supported by the support. The die clamper 200 includes a die driver 210, a first pillar unit 230, and a second pillar unit 240. The die driver 210 includes a die clamping motor 212, a speed reducer 214, a ball screw 216, a movable disk 218, and a fixed disk 220.

The first pillar unit 230 is formed of four pillars extending in the direction Z. The base 300 is fixed to the upper end of the first pillar unit 230, and the fixed disk 220 of the die driver 210 is fixed to the lower end of the first pillar unit 230. That is, the base 300 and the fixed disk 220 are fixed to each other via the first pillar unit 230. FIG. 3 shows only two pillars disposed on the side facing in the direction −Y out of the four pillars, which form the first pillar unit 230.

The fixed disk 220 has the shape of a flat plate. The fixed disk 220 is fixed to the lower end of the first pillar unit 230 described above so that the plate surfaces of the fixed disk 220 are parallel to the horizontal direction.

The die clamping motor 212 in the present embodiment is formed of a motor with an electromagnetic brake. The die clamping motor 212 uses the electromagnetic brake to generate a braking force in a state in which no voltage is applied to the excitation coil of the motor to restrict the rotation of the motor shaft while allowing rotation of the motor shaft in a state in which voltage is applied to the excitation coil. The die clamping motor 212 is disposed below the lower die 15. More specifically, the die clamping motor 212 is fixed to a lower portion of the fixing disk 220 fixed to the lower end of the first pillar unit 230 with the output shaft of the motor facing upward. The die clamping motor 212 is driven under the control of the first controller 103.

The speed reducer 214 is coupled to the output shaft of the die clamping motor 212. The ball screw 216 is coupled to the output shaft of the speed reducer 214. The speed reducer 214 in the present embodiment is a concentric-shaft-type speed reducer having the input shaft and output shaft aligned with each other along the same axis. The speed reducer 214 is fixed to the fixed disk 220 with the ball screw 216, which is coupled to the speed reducer 214, protruding upward beyond the fixed disk 220.

The movable disk 218 has the shape of a flat plate. The movable disk 218 is so coupled to the ball screw 216 that the plate surfaces of the disk are parallel to the horizontal direction, and the first pillar unit 230 passes through the movable disk 218 in the direction Z. The rotation of the ball screw 216 driven by the die clamping motor 212 moves the movable disk 218 in the direction Z relative to the fixed disk 220 along the first pillar unit 230 serving as a guide with the lower surface of the movable disk 218 facing the upper surface of the fixed disk 220.

The second pillar unit 240 in the present embodiment is formed of four pillars extending in the direction Z. The second pillar unit 240 is provided so as to pass through the base 300 in the direction Z. The movable disk 218 is fixed to the lower end of the second pillar unit 240. The injector 110 is fixed to the upper end of the second pillar unit 240.

FIG. 3 shows only two pillars disposed on the side facing in the direction −X out of the four pillars, which form the second pillar unit 240.

Figure 4:
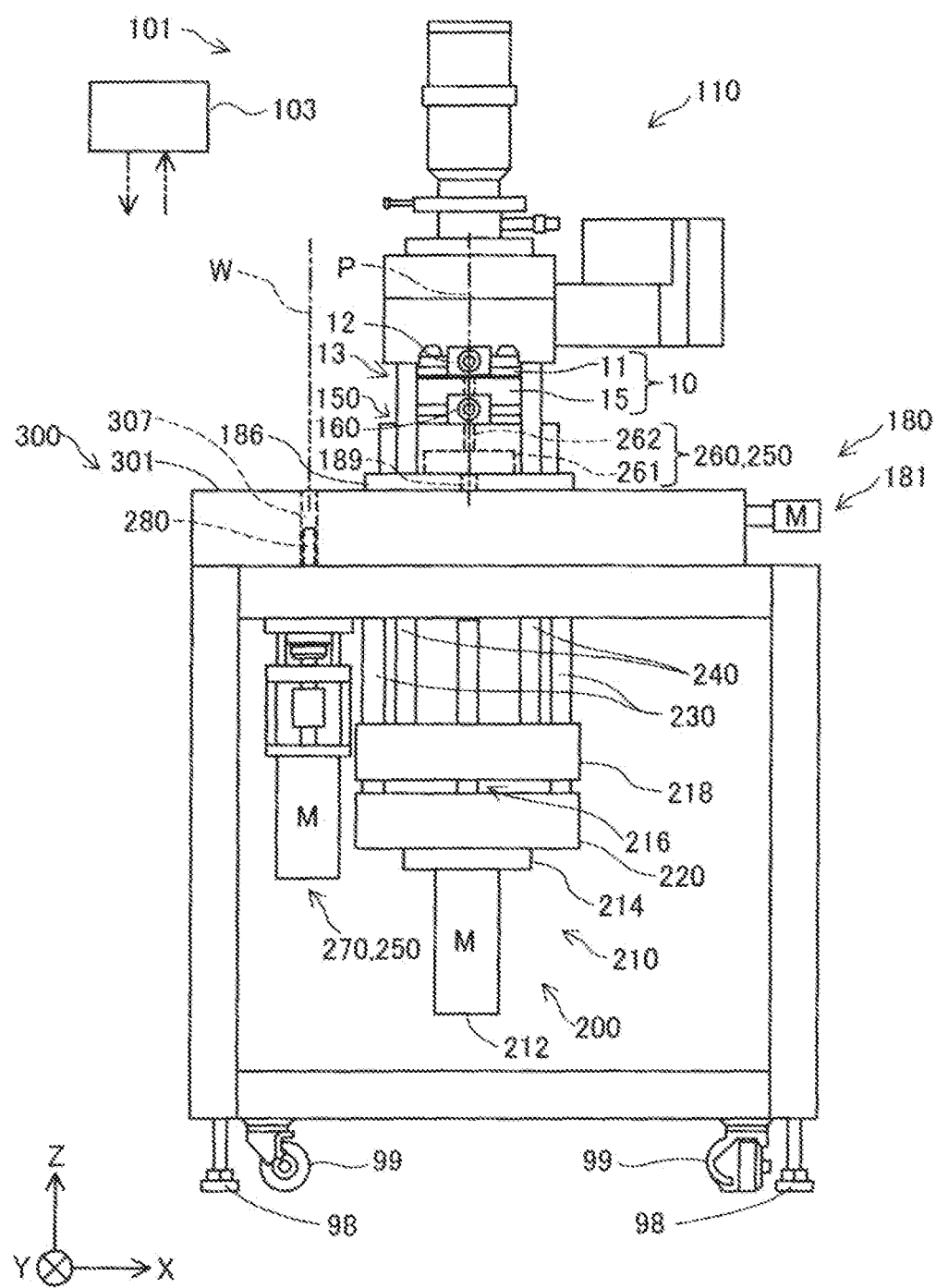
FIG. 4 is a second view showing the schematic configuration of the first injection molding machine in the first embodiment.

FIG. 4 is a second view showing the schematic configuration of the first injection molding machine 101. FIG. 4 shows that the molding die 10 installed in the first injection molding machine 101 is clamped. The die clamping motor 212 is driven to allow the die clamper 200 to clamp and open the molding die 10 by moving the injector 110 and the upper die 11 along the vertical direction, as shown in FIGS. 3 and 4. In more detail, the driving force produced by the die clamping motor 212 is transmitted to the ball screw 216 via the speed reducer 214 to move the movable disk 218 coupled to the ball screw 216 in the direction Z along the first pillar unit 230, so that the injector 110 and the upper die 11 fixed to the movable disk 218 are moved via the second pillar unit 240 in the direction Z. The die clamper 200 can perform the die clamping by moving the movable disk 218 in the direction −Z to move the injector 110 and the upper die 11 in the direction −Z relative to the lower die 15. Similarly, the die clamper 200 can perform the die opening by moving the movable disk 218 in the direction +Z to move the injector 110 and the upper die 11 in the direction +Z relative to the lower die 15. An injection molding machine that performs the die opening and die clamping along the vertical direction, such as the first injection molding machine 101, is called in some cases a vertical injection molding apparatus or a vertical injection molding machine.

In the present embodiment, the electromagnetic brake of the die clamping motor 212 described above restricts the rotation of the motor shaft of the die clamping motor 212 in the state in which no voltage is applied to the die clamping motor 212, thereby preventing unintentional rotation of the ball screw 216 due to a downward load exerted by the injector 110, the upper die 11, and the movable disk 218. The configuration described above prevents unintentional downward movement of the injector 110 and the upper die 11 toward the lower die 15.

The position changer 180 is configured to be capable of linearly moving the lower die support 150 along an intersecting direction that is a direction that intersects with the vertical direction. In the present embodiment, the position changer 180 is configured to be capable of linearly moving the lower die support 150 along the direction X. The position changer 180 includes a movable section 186, which supports the lower die support 150, and an electrically driven actuator 181, which moves the movable section 186. The electrically driven actuator 181 is formed of a ball screw and a motor that rotates the ball screw. The electrically driven actuator 181 is driven to allow the position changer 180 in the present embodiment to move the movable section 186 so as to slide in the direction X relative to the base 300. The electrically driven actuator 181 is driven under the control of the first controller 103.

Figure 5:
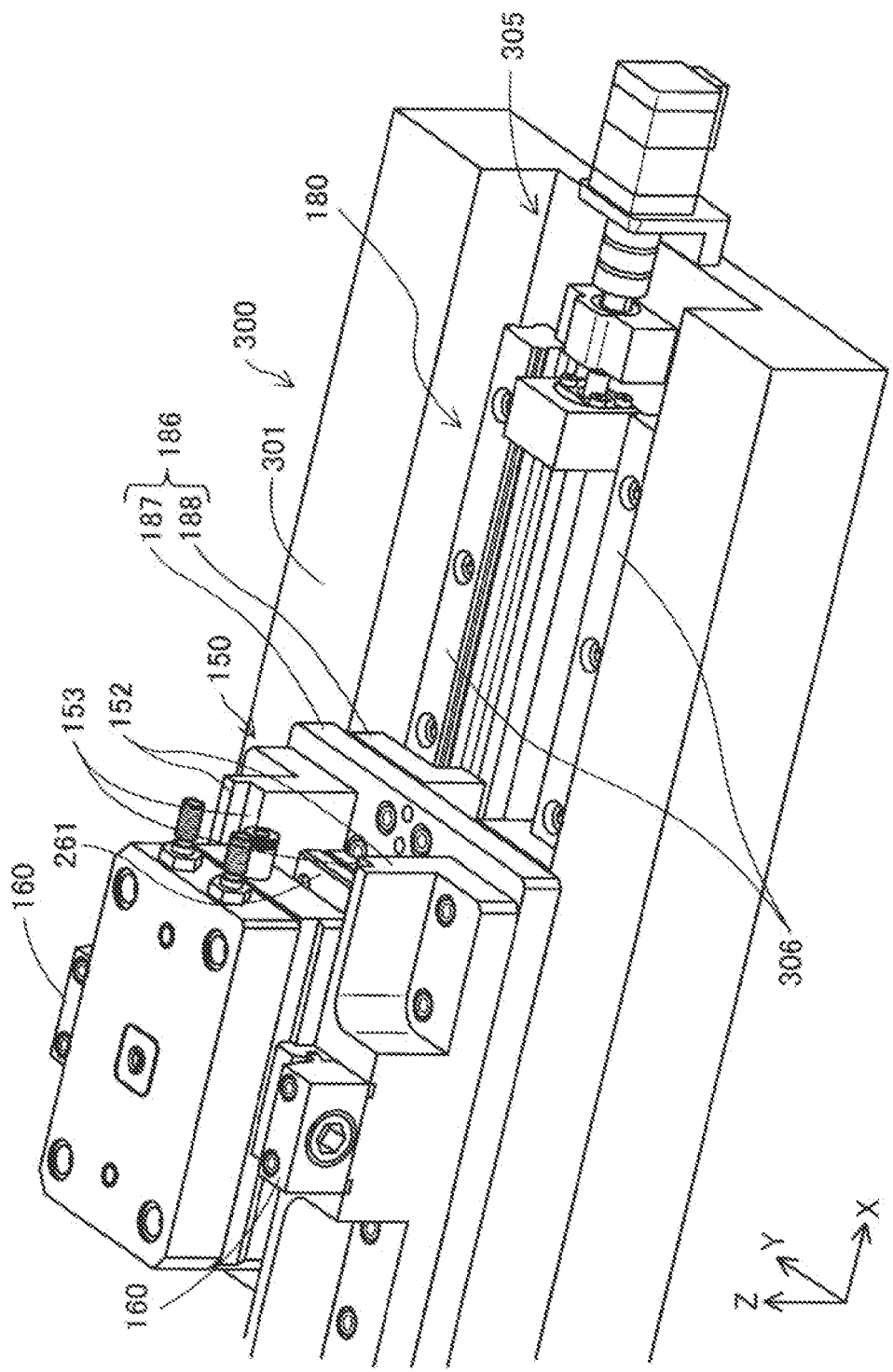
FIG. 5 is a perspective view showing a lower die support and a position changer in the first embodiment.

FIG. 5 is a perspective view showing the lower die support 150 and the position changer 180. In FIG. 5, the second pillar unit 240 is omitted. The electrically driven actuator 181 of the position changer 180 is disposed along the direction X in a depression 305 formed in the base 300, as shown in FIG. 5. The depression 305 is a portion where part of an upper surface 301 of the base 300 is downwardly depressed, and is formed along the direction X.

Linear guides 306 are further provided in the depression 305. The linear guides 306 function as a guide along which the movable section 186 is moved by the electrically driven actuator 181. The linear guides 306 are formed of a pair of rail-shaped members elongated in the direction X and parallel to each other, and are fixed to the bottom surface of the depression 305 with bolts.

The movable section 186 includes a plate section 187, which is a rectangular-plate-shaped member that supports the lower die support 150, and leg sections 188, which support the plate section 187. The plate section 187 and the leg sections 188 are fixed to each other via bolts. The leg sections 188 are coupled to the electrically driven actuator 181. The leg sections 188 are so shaped as to engage with the linear guides 306 in the direction Y. Since the engagement between the leg sections 188 and the linear guides 306 allows movement of the movable section 186 along the direction X but restricts movement of the movable section 186 along the direction Y, the electrically driven actuator 181 can be driven to stably move the movable section 186 along the direction X.

The lower die support 150 described above includes a pair of blocks 152 so disposed as to face each other in the direction Y. The blocks 152 are fixed to the upper surface of the plate section 187 via bolts. The blocks 152 each have an edge section 153, where the lower die 15 is placed. The lower die clamps 160 described above are provided at the upper surfaces of the blocks 152. In more detail, the lower die clamps 160 are provided at the upper surfaces of the blocks 152 in a one-to-one relationship. The lower die clamps 160 fix the lower die 15 placed at the edge sections 153 of the blocks 152 by sandwiching the lower die 15 in the direction Y.

The position changer 180 is configured to be capable of switching two states from one to the other by moving the lower die support 150, a state in which the lower die 15 is located in an injection position P shown in FIG. 3, and a state in which the lower die 15 is located in a position different from the injection position P. The injection position P refers to a position where the lower die 15 and the upper die 11 face each other. The position changer 180 in the present embodiment positions the lower die 15 between the injection position P or a standby position W by moving the lower die support 150 in the direction X. FIG. 2 shows the state in which the lower die 15 is located in the standby position W, and FIG. 3 shows the state in which the lower die 15 is located in the injection position P. The first injection molding machine 101 may include, for example, positioning pins that position the lower die 15 in the injection position P and the standby position W.

The ejector 250 shown in FIG. 3 is a member that removes a molded product from the lower die 15. The ejector 250 in the present embodiment removes a molded product from the lower die 15 in the standby position W described above. The ejector 250 includes a body 260, which lifts the molded product out of the lower die 15, and an ejector driver 270, which causes the body 260 to operate. In the present embodiment, the body 260 is coupled to the lower die 15, and the position changer 180 moves the body 260 along with the lower die 15 along the direction X. The ejector driver 270 is fixed to the base 300.

The body 260 includes a flat-plate-shaped ejector plate 261 and a shaft-shaped ejector pin 262 fixed to the ejector plate 261. The body 260 is coupled to the lower die 15 with the ejector pin 262 inserted from a position below the lower die 15 into a through hole formed so as to pass through the cavity-defining portion of the lower die 15 in the direction Z. The ejector plate 261 is disposed between the lower die 15 and the plate section 187 in the direction Z and between the blocks 152, which form the lower die support 150, in the direction Y with the lower die 15 supported by the lower die support 150, as shown in FIG. 5. A hole 189, which passes through the plate section 187 in the direction Z, is provided in the plate section 187 in a position where the hole 189 overlaps with at least part of the ejector plate 261 when viewed along the direction Z, as shown in FIG. 3. In the present embodiment, the hole 189 is located in a central portion of the plate section 187 in the directions X and Y.

The ejector driver 270 is formed of a ball screw and a motor that rotates the ball screw. The ejector driver 270 is disposed below the base 300 and fixed to the base 300, as shown in FIG. 1. The ejector driver 270 is driven under the control the first controller 103.

A contact section 280 is coupled to the ball screw of the ejector driver 270. The contact section 280 is disposed in a cavity 307, which passes through the base 300 in the direction Z.

The ejector driver 270 can lift the body 260 via the contact section 280, which is coupled to the ball screw, by moving the contact section 280 in the direction +Z with the lower die 15 located in the standby position W. In more detail, the ejector driver 270 is driven to cause the contact section 280 to protrude in the direction +Z from the cavity 307, further pass through the hole 189 formed in the plate section 187 in the direction +Z, and come into contact with the ejector plate 261. The contact section 280 then further moves in the direction +Z while being in contact with the ejector plate 261 to lift the body 260 in the direction +Z. The ejector pin of the lifted body 260 pushes the molded product in the direction +Z, so that the molded product is removed from the lower die 15.

Figure 6:
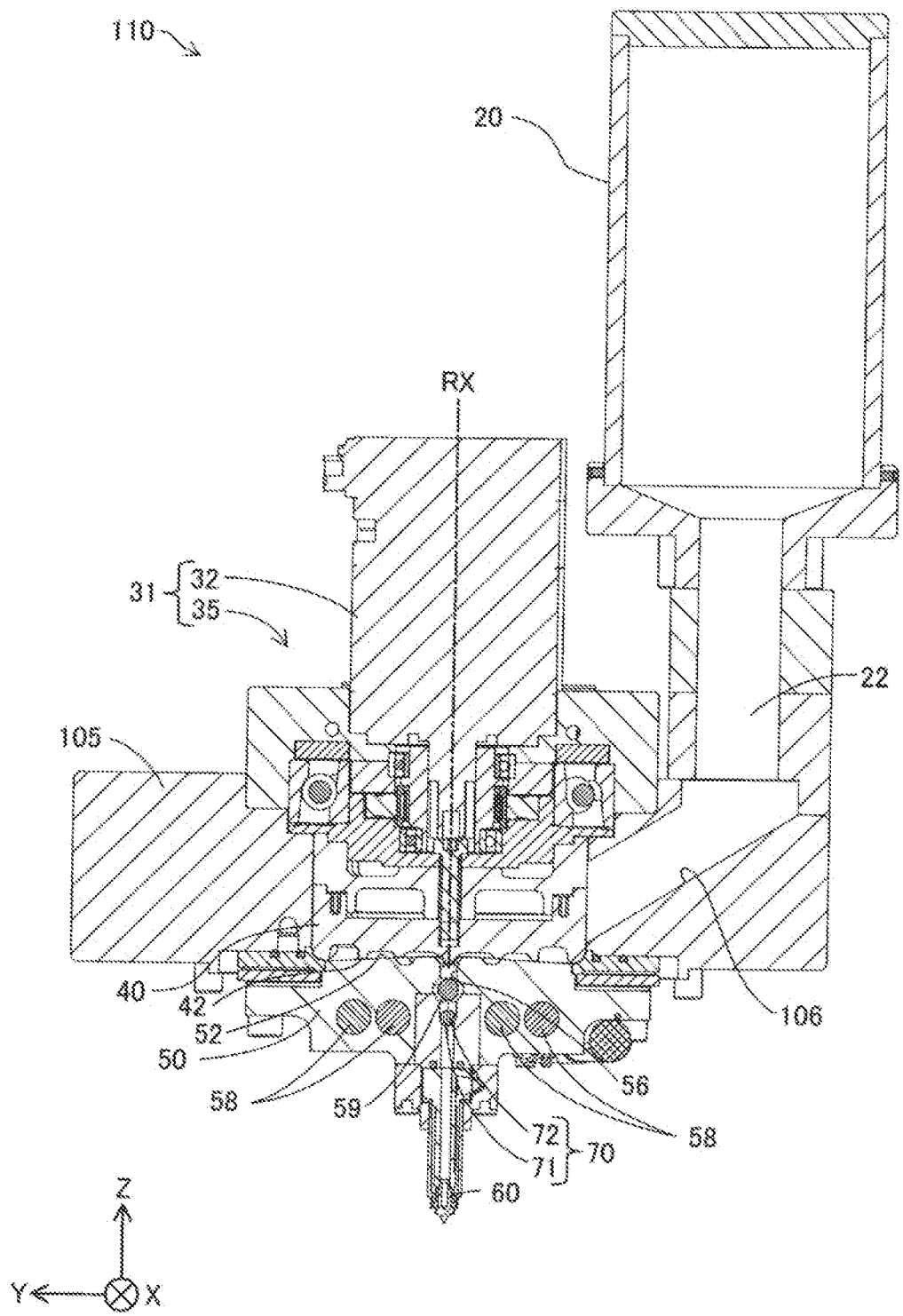
FIG. 6 is a cross-sectional view showing the configuration of an injector.

FIG. 6 is a cross-sectional view showing the configuration of the injector 110 provided in the first injection molding machine 101. The injector 110 includes a material supplier 20, a rotor 40, a barrel 50, heaters 58, a nozzle 60, and an injection control mechanism 70.

The injector 110, in which the rotor 40, the barrel 50, and the heaters 58 plasticize at least part of a material supplied from the material supplier 20 to the space between the rotor 40 and the barrel 50 to produce the molding material, injects the molding material via the nozzle 60 toward the cavity of the molding die 10. In the present embodiment, the term "plasticize" means that a material having thermal plasticity is heated and melted. The term "melted" means not only that a material having thermal plasticity is heated to a temperature higher than or equal to the melting point of the material and changed to a liquid form but that the material having thermal plasticity softens when heated to a temperature higher than or equal to the glass transition point so that the material exhibits fluidity.

The material supplier 20 in the present embodiment is formed of a hopper. The material supplier 20 houses a material in the form of pellets, powder, or any other state. In the present embodiment, ABS resin in the form of pellets is used as the material. A supply path 22 is provided below the material supplier 20, as shown in FIG. 6. The supply path 22 is coupled to an introduction path 106 formed in a housing 105. The material supplier 20 supplies the space between the rotor 40 and the barrel 50 with the material via the supply path 22 and the introduction path 106.

The rotor 40 is also called a scroll or a flat screw. The rotor 40 is rotationally driven around an axis of rotation RX extending along the direction Z by a rotor driver 31, which is formed of a drive motor 32 and a rotor speed reducer 35. The rotor 40 and the rotor speed reducer 35 are housed in the housing 105. The rotor 40 is rotated by the rotor driver 31 under the control of the first controller 103.

A communication hole 56, through which the produced shaping material flows, is formed at the center of the barrel 50. An injection cylinder 71 of the injection control mechanism 70, which will be described later, is coupled to the communication hole 56. The communication hole 56 is provided with a check valve 59 located in a position upstream from the injection cylinder 71.

Figure 7:
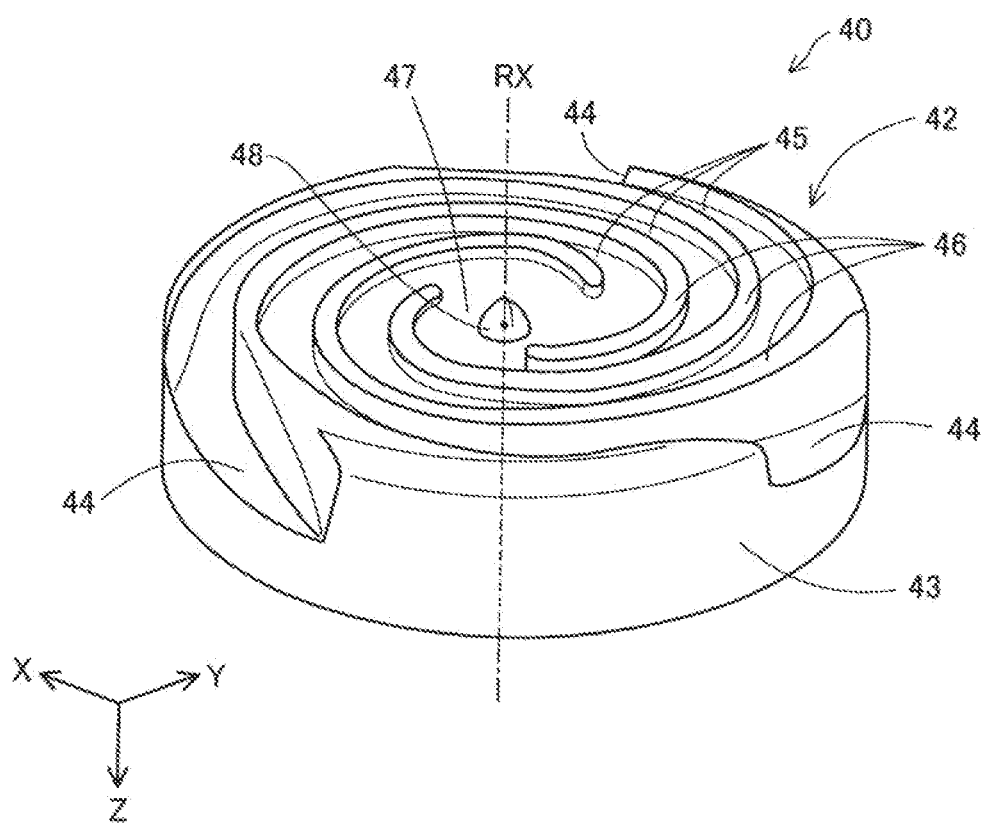
FIG. 7 is a perspective view showing a schematic configuration of a rotor.

FIG. 7 is a perspective view showing a schematic configuration of the rotor 40. The rotor 40 has a substantially columnar shape having a height in the direction along the center axis thereof being smaller than the diameter thereof. The rotor 40 has a groove forming surface 42, which faces the barrel 50, and spiral grooves 45 are formed in the groove forming surface 42 around a central section 47 of the rotor 40. The grooves 45 communicate with a material loading port 44 formed in a rotor side surface 43 of the rotor 40. The material supplied from the material supplier 20 is supplied into the grooves 45 via the material loading port 44. The grooves 45 are separated by protruding strips 46 and formed therebetween. FIG. 7 shows three grooves 45 by way of example, and the number of grooves 45 may be one or two or more. The grooves 45 do not necessarily have a spiral shape, may instead have a helical shape or the shape of an involute curve, or may even extend in an arcuate shape from the center to the periphery.

The rotor 40 in the present embodiment includes a congestion suppressor 48, which is located in the central section 47 and protrudes toward the communication hole 56. In the present embodiment, the congestion suppressor 48 has a substantially conical shape, and the center axis of the congestion suppressor 48 substantially coincides with the axis of rotation RX of the rotor 40. The tip of the congestion suppressor 48 is located in the communication hole 56 formed in the barrel 50. The congestion suppressor 48 efficiently guides the molding material from the central section 47 into the communication hole 56, preventing the molding material from being congested at the central section 47. In other embodiments, the rotor 40 may not include the congestion suppressor 48.

Figure 8:
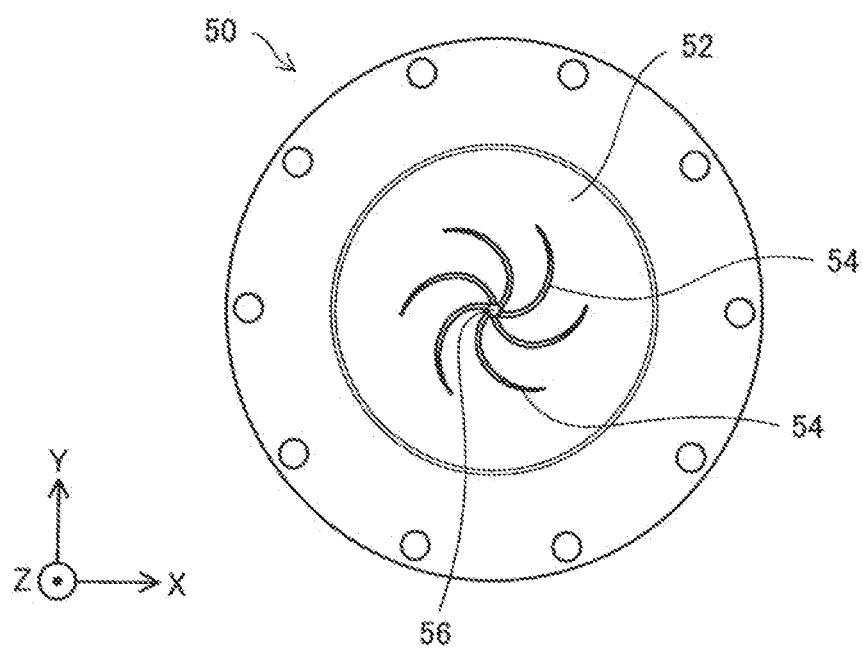
FIG. 8 is a schematic plan view of a barrel.

FIG. 8 is a schematic plan view of the barrel 50. The barrel 50 has a rotor facing surface 52, which faces the groove forming surface 42 of the rotor 40. The communication hole 56 described above is formed so as to open at a central portion of the rotor facing surface 52, as shown in FIG. 8. A plurality of guide grooves 54, which are coupled to the communication hole 56 and extend spirally from the communication hole 56 toward the periphery of the rotor facing surface 52, are formed in the rotor facing surface 52. In other embodiments, the guide grooves 54 may not be coupled to the communication hole 56. The barrel may not be provided with the guide grooves 54.

The heaters 58 heat the material supplied to the space between the groove forming surface 42 of the rotor 40 and the rotor facing surface 52 of the barrel 50. In the present embodiment, four heaters 58 are provided in the barrel 50, as shown in FIG. 6. The output of the heaters 58 is controlled by the first controller 103.

The material supplied into the grooves 45 of the rotor 40 is guided by the rotation of the rotor 40 to the central section 47 of the rotor 40 while being plasticized in the space between the groove forming surface 42 of the rotor 40 and the rotor facing surface 52 of the barrel 50 by the rotation of the rotor 40 and the heat produced by the heaters 58. The material flowing to the central section 47 is fed to the communication hole 56 provided at the center of the barrel 50, and is further guided via the communication hole 56 to the injection control mechanism 70.

The injection control mechanism 70 includes the injection cylinder 71 and a plunger 72, as shown in FIG. 6. The injection control mechanism 70 has the function of ejecting the molding material in the injection cylinder 71 and injecting the molding material into the cavity of the molding die 10. The injection control mechanism 70 controls the amount of ejected molding material via the nozzle 60 under the control of the first controller 103. The injection cylinder 71 is a substantially cylindrical member coupled to the communication hole 56 of the barrel 50. In the present embodiment, the injection cylinder 71 is disposed along the direction X. The plunger 72 is inserted in the injection cylinder 71. The plunger 72 slides in the interior of the injection cylinder 71 and pumps the molding material in the injection cylinder 71 to the nozzle 60. The plunger 72 is driven by a motor that is not shown.

The die temperature adjuster 710 disposed in the ancillary instrument unit 700 shown in FIG. 2 circulates a heat carrying medium through a cooling pipe provided in the molding die 10 via a pipe that is not shown to adjust the temperature of the molding die 10. The material feeder 720 is formed of a dryer that stores the material used in the first injection molding machine 101 while dehumidifying and drying the material, and a loader that feeds the material stored in the dryer to the material supplier 20, and the material feeder 720 feeds the material to the material supplier 20 via a tube and other components that are not shown. In the present embodiment, the mold temperature adjuster 710 and the material feeder 720 are controlled by the first controller 103.

The robot 451 disposed in the robot unit 450 is formed of a horizontally articulated robot and includes an arm and a second controller 455. An end effector is attached to the arm of robot 451. In the present embodiment, a suction pad that sucks the molded product and the insert member is attached as the end effector to the arm. The robot 451 is installed on a robot base 452 fixed to the enclosure of the robot unit 450. In other embodiments, the robot 451 is not necessarily a horizontally articulated robot and may, for example, be an orthogonally operating robot or a vertically articulated robot.

The second controller 455 is formed of a computer, as the first controller 103 is. The second controller 455, in which the processor executes a program and instructions read onto the primary storage device to control the operation of the arm and the end effector, causes the robot 451 to perform a variety of functions. In the present embodiment, the operation of the robot 451 is controlled by the first controller 103 via the second controller 455.

In the present embodiment, the robot 451 disposed in the robot unit 450 functions as a material supply robot and a transport robot. The material supply robot refers to a robot that performs placement operation of placing the insert member in the cavity of the molding die 10. In the present embodiment, the robot 451 that functions as the material supply robot places the insert member in the lower die 15 located in the standby position W to place the insert member in the cavity of the molding die 10.

The transport robot refers to a robot that performs transport operation of transporting the integrated product molded by the first injection molding machine 101. In the present embodiment, the robot 451 that functions as the transport robot sucks the integrated product molded by the first injection molding machine 101 and removed from the lower die 15 in the standby position W by the ejector 250, and transports the sucked integrated product to an inspection apparatus that is not shown but is installed on the robot base 452, and the inspection apparatus performs a visual inspection of the integrated product. The robot 451 then transports the integrated product to a packing apparatus that is not shown but is installed on the robot base 452, and the packing apparatus packs the integrated product.

The end effector attached to the arm of the robot 451 may, for example, include a portion that sucks the molded product and a portion that sucks the insert member. When the robot 451 having the form described above functions as the transport robot and the material supply robot as in the present embodiment, the robot 451 can suck the molded product removed from the lower die 15 while sucking the insert member, whereby the distance over which the arm travels from the timing of suction of the molded product removed from the lower die to the timing of placement of the insert member in the lower die 15 can be reduced. The injection molding can therefore be performed more efficiently. The end effector may, for example, be formed of a gripper that grips the molded product and the insert member in place of a suction pad. In this case, the end effector may include, for example, a portion that grips the molded product and a portion that grips the insert member.

In the injection molding system 5 according to the present embodiment described above, the main unit 100 is so configured that the optional unit 400 is attachable thereto and detachable therefrom. The configuration described above allows space saving as compared with a case where the units or the apparatuses are separately installed, with the degree of freedom of customization of the injection molding system 5 increased.

In the present embodiment, in the state in which the upper die 11 and the lower die 15 are installed in the first injection molding machine 101, the injector 110, the upper die 11, and the lower die 15 are sequentially arranged from above in the vertical direction, and the injector 110 includes the flat screw, the barrel 50, and the heaters 58 and plasticizes at least part of the material through the rotation of the flat screw and the heat produced by the heaters 58 to produce the molding material. The size of the first injection molding machine 101 can thus be reduced in the horizontal direction as compared, for example, with a case where the injector 110, the upper die 11, and the lower die 15 are arranged along the horizontal direction, whereby the size of the main unit 100 can be reduced in the horizontal direction. Furthermore, the size of the first injection molding machine 101 can be reduced as compared, for example, with a case where the injector 110 includes an in-line screw in place of a flat screw, whereby the size of the main unit 100 can be reduced. The space saving of the injection molding system 5 can therefore be readily achieved. Moreover, for example, the smaller the main unit 100 is, the greater number of optional units 400 or the larger optional unit 400 can be attached to the main unit 100, whereby the degree of freedom of customization of the injection molding system 5 can be increased.

In the present embodiment, the injection molding system 5 further includes the die clamper 200, which performs the die clamping and die opening by moving the injector 110 and the upper die 11 along the vertical direction. The aspect described above allows the injector 110 and the upper die 11 to move in the vertical direction relative to the lower die 15 to perform the die clamping and die opening without movement of the lower die 15 in the vertical direction. The aspect described above therefore allows the removal of the integrated product from the lower die 15 and the placement of the insert member in the lower die 15 to be performed in a fixed position in the vertical direction. The step of removing the integrated product from the lower die 15 and the step of placing the insert member in the lower die 15 can therefore be more readily automated.

B. Second Embodiment

Figure 9:
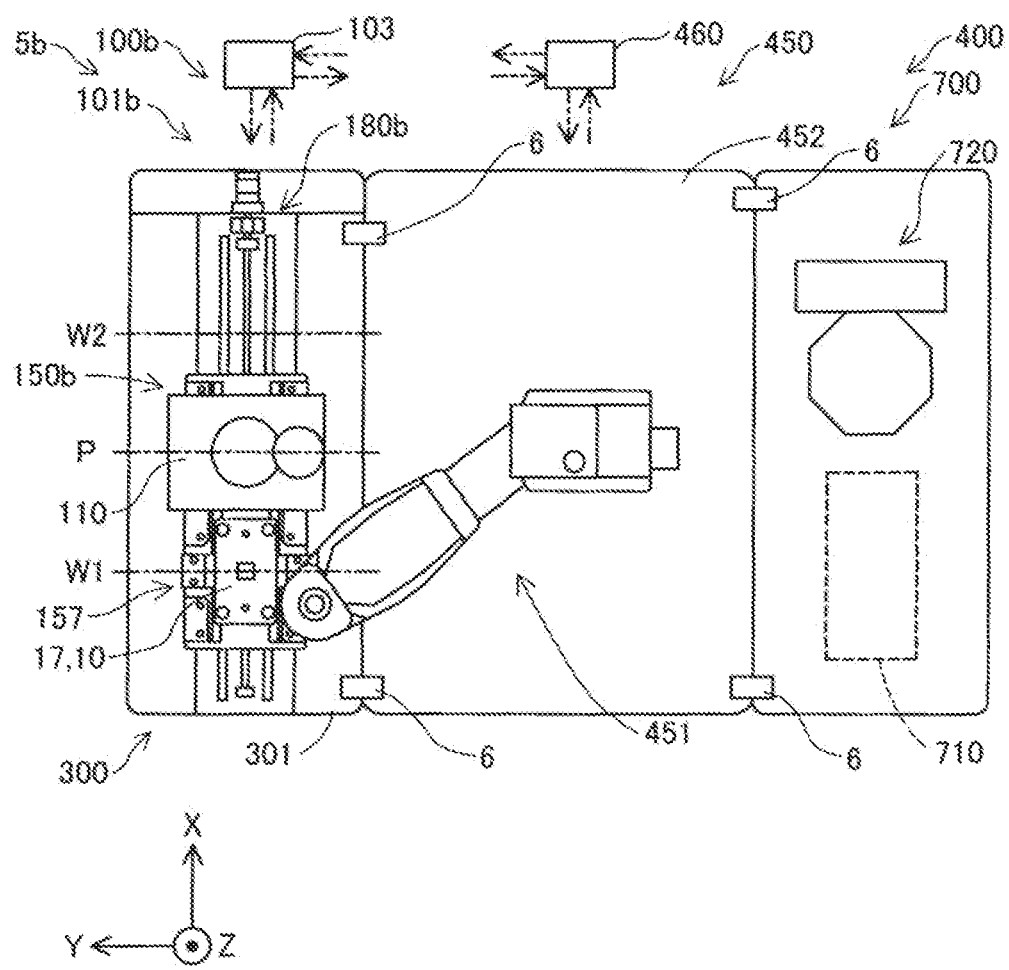
FIG. 9 is a plan view showing a schematic configuration of an injection molding system according to a second embodiment.
Figure 10:
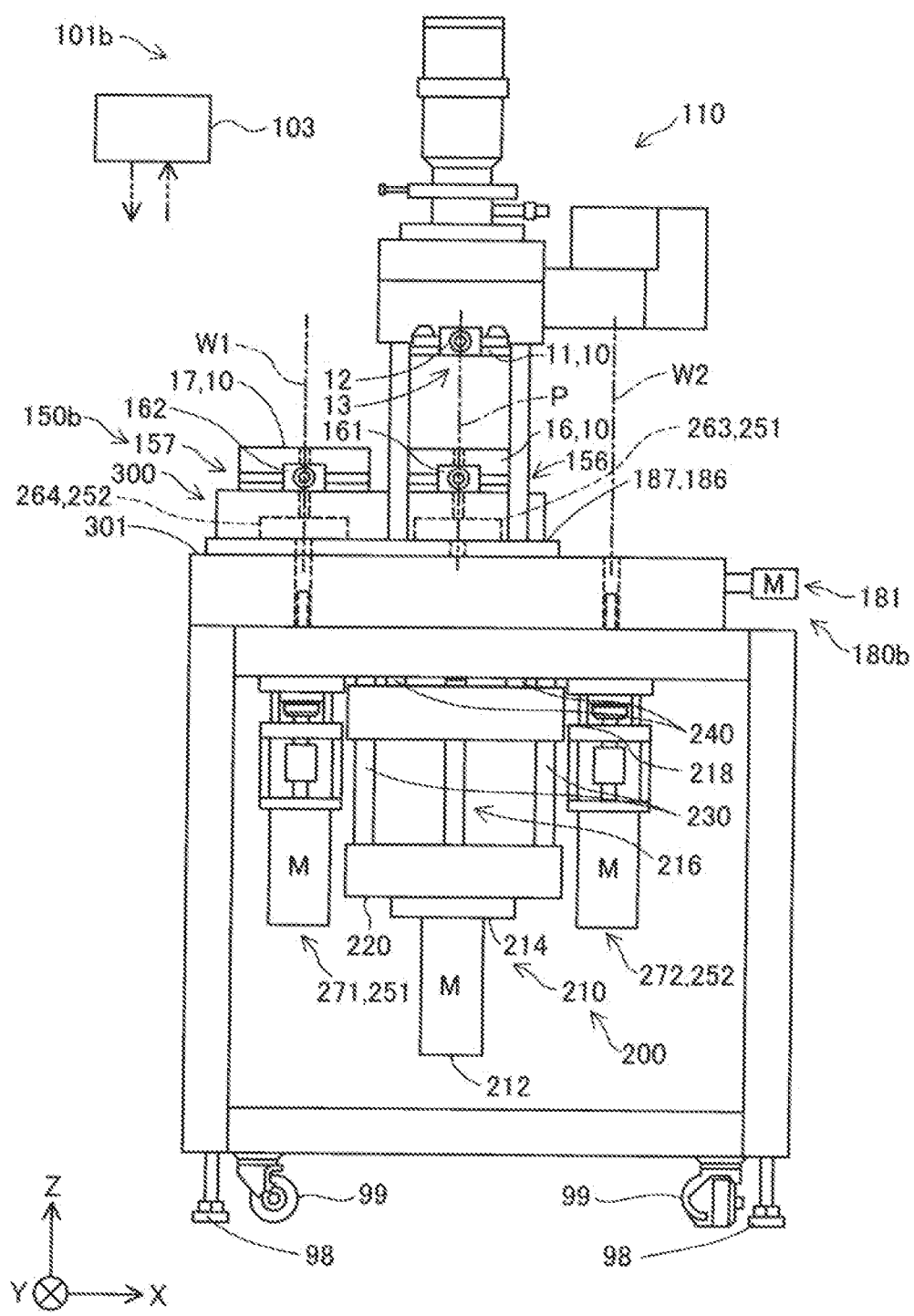
FIG. 10 is a first view showing a schematic configuration of a first injection molding machine in the second embodiment.

FIG. 9 is a plan view showing a schematic configuration of an injection molding system 5b according to a second embodiment. FIG. 10 is a first view showing a schematic configuration of a first injection molding machine 101b disposed in a main unit 100b in the present embodiment. FIG. 9 is a top view showing the injection molding system 5b with the covers of the units removed, as FIG. 2 described in the first embodiment is. In the present embodiment, the first injection molding machine 101b differs from the first injection molding machine 101 in the first embodiment in that the first injection molding machine 101b includes a first support 156, which supports a first lower die 16 as the lower die, and a second support 157, which supports a second lower die 17 as the lower die, as shown in FIG. 10. In FIG. 9, the first lower die 16 and the first support 156 are located below the injector 110 but are not shown in FIG. 9. The portions of the injection molding system 5b that are not particularly described are the same as those in the first embodiment.

Figure 11:
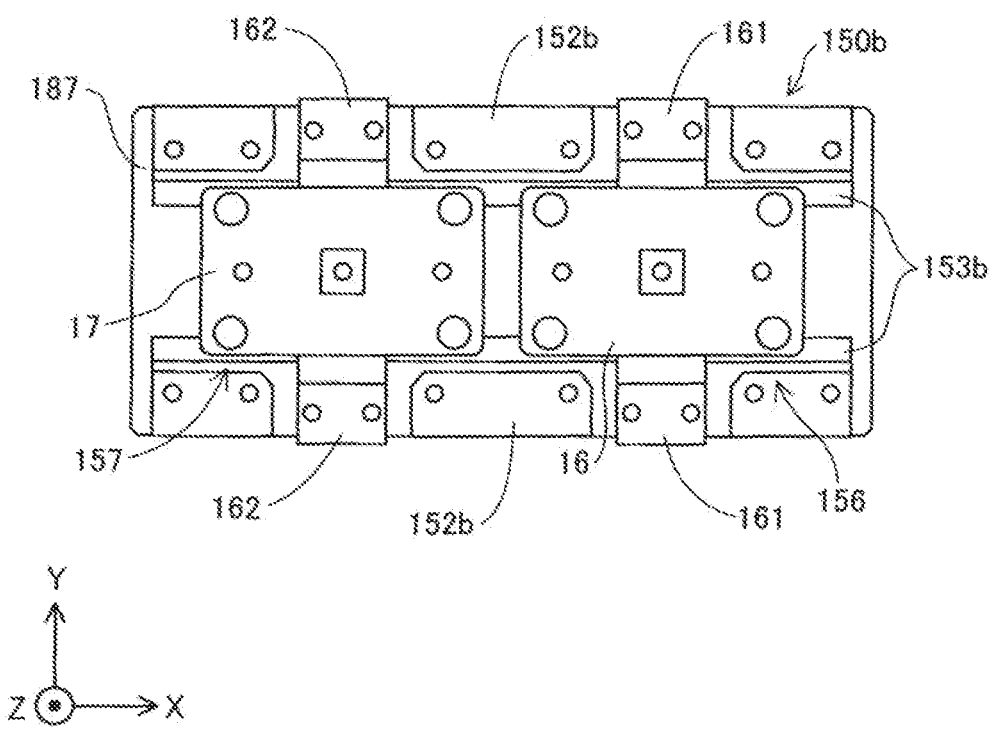
FIG. 11 is a plan view showing a schematic configuration of a lower die support in the second embodiment.

FIG. 11 is a plan view showing a schematic configuration of a lower die support 150b in the second embodiment. FIG. 11 is a top view showing the lower die support 150b and the plate section 187, which supports the lower die support 150b. The lower die support 150b includes the first support 156 and the second support 157 described above, as shown in FIGS. 10 and 11. The first support 156 in the present embodiment is formed of portions of edge sections 153b of a pair of blocks 152b, which form the lower die support 150b, the portions that support the first lower die 16. Similarly, the second support 157 is formed of portions of the edge sections 153b of the blocks 152b, the portions that support the second lower die 17. The first support 156 is located in a position shifted in the direction +X from the second support 157. A pair of first lower die clamps 161 and a pair of second lower die clamps 162 are provided at the upper surfaces of the blocks 152b. The first lower die clamps 161 fix the first lower die 16 supported by the first support 156 by sandwiching the first lower die 16 in the direction Y, as the lower die clamps 160 described in the first embodiment do. Similarly, the second lower die clamps 162 fix the second lower die 17 supported by the second support 157 by sandwiching the second lower die 17 in the direction Y.

A position changer 180b is configured to be capable of moving the first support 156 and the second support 157. In the present embodiment, the position changer 180b linearly moves the first support 156 and the second support 157 along an intersection direction that intersects with the vertical direction. More specifically, the electrically driven actuator 181 is driven to cause the position changer 180b to move the movable section 186, which supports the lower die support 150b, in such a way that the movable section 186 slides in the direction X relative to the base 300, as in the first embodiment. The first support 156 and the second support 157 therefore linearly move in conjunction with each other along the direction X.

Figure 12:
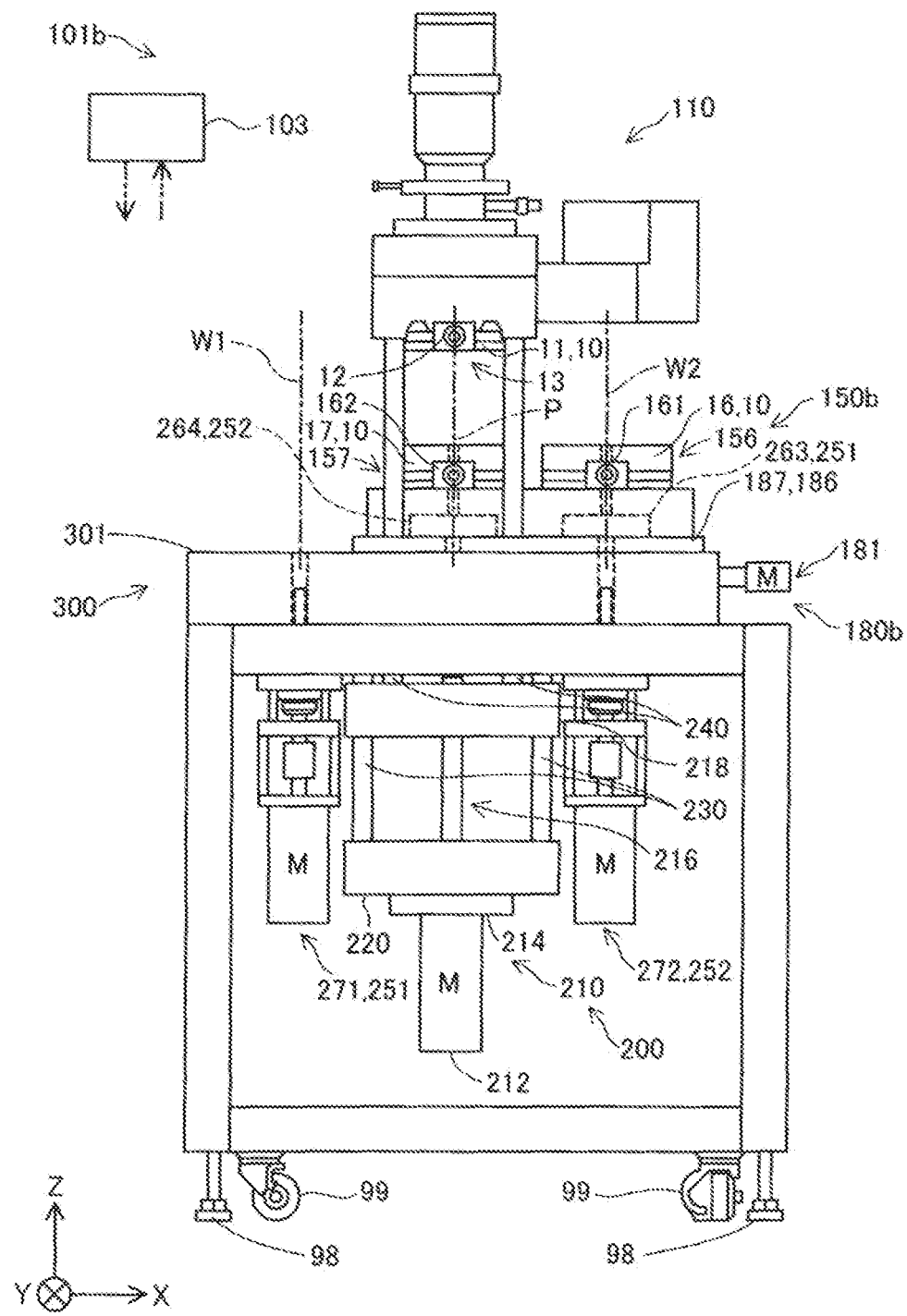
FIG. 12 is a second view showing the schematic configuration of the first injection molding machine in the second embodiment.

FIG. 12 is a second view showing the schematic configuration of the first injection molding machine 101b in the second embodiment. FIG. 12 shows that the position changer 180b has moved the lower die support 150b to a position shifted in the direction +X from the position of the lower die support 150b shown in FIG. 10. The position changer 180b is configured to be capable of switching the state of first injection molding machine 101b between a first state and a second state by moving the first support 156 and the second support 157. The first state refers to a state in which the first lower die 16 is located in the injection position P and the second lower die 17 is located in a position different from the injection position P, as shown in FIG. 10. The second state refers to a state in which the second lower die 17 is located in the injection position P and the first lower die 16 is located in a position different from the injection position P, as shown in FIG. 12.

In the present embodiment, the position changer 180b positions the second lower die 17 in a first standby position W1 in the first state, as shown in FIG. 10. The position changer 180b positions the first lower die 16 in a second standby position W2 in the second state, as shown in FIG. 12. The first standby position W1 and the second standby position W2 both differ from the injection position P. The second standby position W2 is located on the side opposite from the first standby position W1 with the injection position P interposed therebetween in the direction X. That is, the first standby position W1 and the second standby position W2 are separated from each other by the injection position P in the direction X. In the present embodiment, the first standby position W1 is a position shifted in the direction −X from the injection position P, and the second standby position W2 is a position shifted in the direction +X from the injection position P. FIG. 9 described above also shows that the first lower die 16 is located in the injection position P and the second lower die 17 is located in the first standby position W1 in the first state, as FIG. 10 does. In other embodiments, the first injection molding machine 101b may include, for example, a positioning pin that positions the first lower die 16 in the injection position P or the second standby position W2 and a positioning pin that positions the second lower die 17 in the injection position P or the first standby position W1.

The first injection molding machine 101b in the present embodiment includes a first ejector 251 and a second ejector 252, as shown in FIGS. 10 and 12. The first ejector 251 is a member that removes the molded product from the second lower die 17 in the first standby position W1. The second ejector 252 is a member that removes the molded product from the first lower die 16 in the second standby position W2.

The configuration of the first ejector 251 and the configuration of the second ejector 252 are the same as the configuration of the ejector 250 described in the first embodiment. That is, the first ejector 251 includes a first body 263, which is coupled to the second lower die 17 and used to lift the molded product from the second lower die 17, and a first ejector driver 271, which causes the first body 263 to operate. Similarly, the second ejector 252 includes a second body 264, which is coupled to the first lower die 16 and used to lift the molded product from the first lower die 16, and a second ejector driver 272, which causes the second body 264 to operate.

Also in the present embodiment, the robot 451 disposed in the robot unit 450 functions as the material supply robot, which performs the placement operation, and the transport robot, which performs the transport operation, as in the first embodiment. In more detail, in the present embodiment, the robot 451 that functions as the material supply robot places, as the placement operation, the insert member in the second lower die 17 located in the first standby position W1 and the first lower die 16 located in the second standby position W2. The robot 451 that functions as the transport robot transports, as the transport operation, the integrated product removed from the second lower die 17 in the first standby position W1 and the integrated product removed from the first lower die 16 in the second standby position W2.

The robot 451 in the present embodiment continuously performs the transport operation and the placement operation described above. More specifically, in the first state, the robot 451 first sucks the integrated product removed from the second lower die 17 by the first ejector 251 in the first standby position W1, and then transports the integrated product from the second lower die 17. The robot 451 then places, in the second lower die 17 located in the first standby position W1, the insert member to mold next the integrated product using the second lower die 17. Similarly, in the second state, the robot 451 sucks the integrated product removed from the first lower die 16 by the second ejector 252 in the second standby position W2, transports the integrated product from the first lower die 16, and places the insert member in the first lower die 16 located in the second standby position W2. The first controller 103 can more efficiently mold the integrated product, for example, by performing insert molding using the lower die located in the injection position P while the robot 451 performs the transport operation and the placement operation described above.

The injection molding system 5b according to the present embodiment described above also allows space saving as compared with the case where the units or the apparatuses are separately installed, with the degree of freedom of customization of the injection molding system 5b increased. In the present embodiment, in particular, the injection molding system 5b includes the position changer 180b, which is configured to be capable of moving the first support 156, which supports the first lower die 16, and the second support 157, which supports the second lower die 17, and the position changer 180b moves the first support 156 and the second support 157 to switch the first state, in which the first lower die 16 is located in the injection position P and the second lower die 17 is located in a position different from the injection position P, to the second state, in which the second lower die 17 is located in the injection position P and the first lower die 16 is located in a different position from the injection position P, and vice versa. Therefore, for example, while the integrated product is molded by using one of the lower dies that is located in the injection position P, the integrated product can be removed from the other lower die located in the position different from the injection position P, and the insert member can be placed in the other lower die. The first lower die 16 and the second lower die 17 can therefore be used to efficiently mold the integrated product.

In the present embodiment, the position changer 180b moves the first support 156 and the second support 157 along the direction X to position the second lower die 17 in the first standby position W1 in the first state, and position the first lower die 16 in the second standby position W2, which is located on the side opposite from the first standby position W1 with the injection position P sandwiched therebetween in the X direction, in the second state. The first injection molding machine 101b includes the first ejector 251, which removes the integrated product from the second lower die 17 in the first standby position W1, and the second ejector 252, which removes the integrated product from the first lower die 16 in the second standby position W2. The position changer 180b can therefore readily switch the first state to the second state and vice versa by linearly moving the first support 156 and the second support 157 along the direction X. In either the first or second state, the integrated product can be readily removed from the lower dies by using the first ejector 251 or the second ejector 252.

In the present embodiment, the robot 451 disposed in the robot unit 450 included in the optional unit 400 places, as the placement operation, the insert member in the second lower die 17 located in the first standby position W1 and in the first lower die 16 located in the second standby position W2. The robot 451 transports, as the transport operation, the integrated product removed from the second lower die 17 in the first standby position W1 and the integrated product removed from the first lower die 16 in the second standby position W2. Therefore, the step of transporting the integrated product removed from one lower die while insert molding is performed by using the other lower die, and the step of placing the insert member in the one lower die in the same manner can be automated. The integrated product can therefore be more efficiently manufactured in the injection molding system 5b.

C. Third Embodiment

Figure 13:
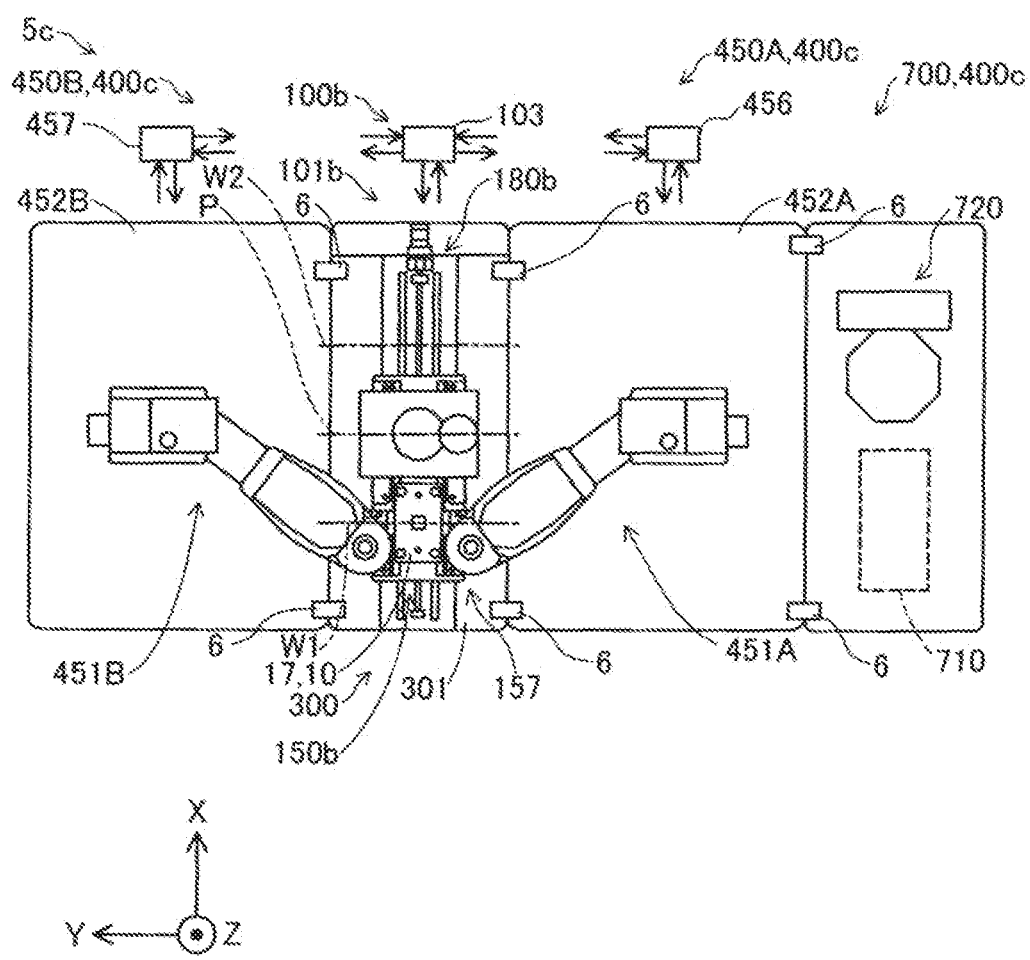
FIG. 13 is a plan view showing a schematic configuration of an injection molding system according to a third embodiment.

FIG. 13 is a plan view showing a schematic configuration of an injection molding system 5c according to a third embodiment. FIG. 13 is a top view showing the injection molding system 5c with the covers of the units removed, as FIG. 9 described in the second embodiment is. Unlike the second embodiment, an optional unit 400c of the injection molding system 5c includes a first robot unit 450A and a second robot unit 450B as the robot unit. The portions of the injection molding system 5c that are not particularly described are the same as those in the second embodiment.

The first robot unit 450A is disposed between the main unit 100b and the ancillary instrument unit 700 in the direction Y, as the robot unit 450 in the first and second embodiments is. The second robot unit 450B is disposed in a position adjacent to the main unit 100b in the direction +Y. That is, the first robot unit 450A and the second robot unit 450B are disposed so as to sandwich the main unit 100b in the direction Y. The units adjacent to each other are linked to each other via the plate-shaped members 6.

A first robot 451A is disposed in the first robot unit 450A. A second robot 451B is disposed in the second robot unit 450B. In the present embodiment, the first robot 451A and the second robot 451B are each formed of the same robot as the robot 451 in the robot unit 450 in the first and second embodiments. The operation of the first robot 451A is controlled by the first controller 103 via a third controller 456 provided in the first robot 451A. The operation of the second robot 451B is controlled by the first controller 103 via a fourth controller 457 provided in the second robot 451B.

The first robot 451A is installed on a first robot base 452A, which is fixed to the enclosure of the first robot unit 450A. The second robot 451B is installed on a second robot base 452B, which is fixed to the enclosure of the second robot unit 450B. In the present embodiment, the inspection apparatus and the packing apparatus, which are not shown, are installed on the first robot base 452A, as the apparatuses are installed on the robot base 452 in the first and second embodiments.

In the present embodiment, the first robot 451A functions as the transport robot, and the second robot 451B functions as the material supply robot. The first robot 451A and the second robot 451B cooperate with each other to continuously perform the transport operation by the first robot 451A and the placement operation by the second robot 451B. More specifically, in the first state, the first robot 451A first sucks the integrated product removed from the second lower die 17 in the first standby position W1 and transports the integrated product from the second lower die 17. The second robot 451B then places the insert member in the second lower die 17 located in the first standby position W1. Similarly, in the second state, the first robot 451A sucks the integrated product removed from the first lower die 16 and transports the integrated product from the first lower die 16, and the second robot 451B then places the insert member in the first lower die 16 located in the second standby position W2.

The first robot 451A and the second robot 451B may each be formed of a robot other than a horizontally articulated robot, as the robot 451 in the first and second embodiments is. The first robot 451A and the second robot 451B may be formed of robots different from each other. For example, the first robot 451A may be formed of a horizontally articulated robot as in the present embodiment, and the second robot 451B may be formed of a vertically articulated robot.

Also in the injection molding system 5c according to the present embodiment described above, the step of transporting the integrated product removed from one lower die while insert molding is performed by using the other lower die, and the step of placing the insert member in the one lower die in the same manner can be automated, as in the second embodiment. The integrated product can therefore be efficiently manufactured in the injection molding system 5c. In the present embodiment, in particular, the robots disposed in the two robot units cooperate with each other to perform the transport operation and the material supply operation, whereby the possibility of more efficient manufacture of the integrated product is increased while the robots are controlled in a simplified manner.

D. Fourth Embodiment

Figure 14:
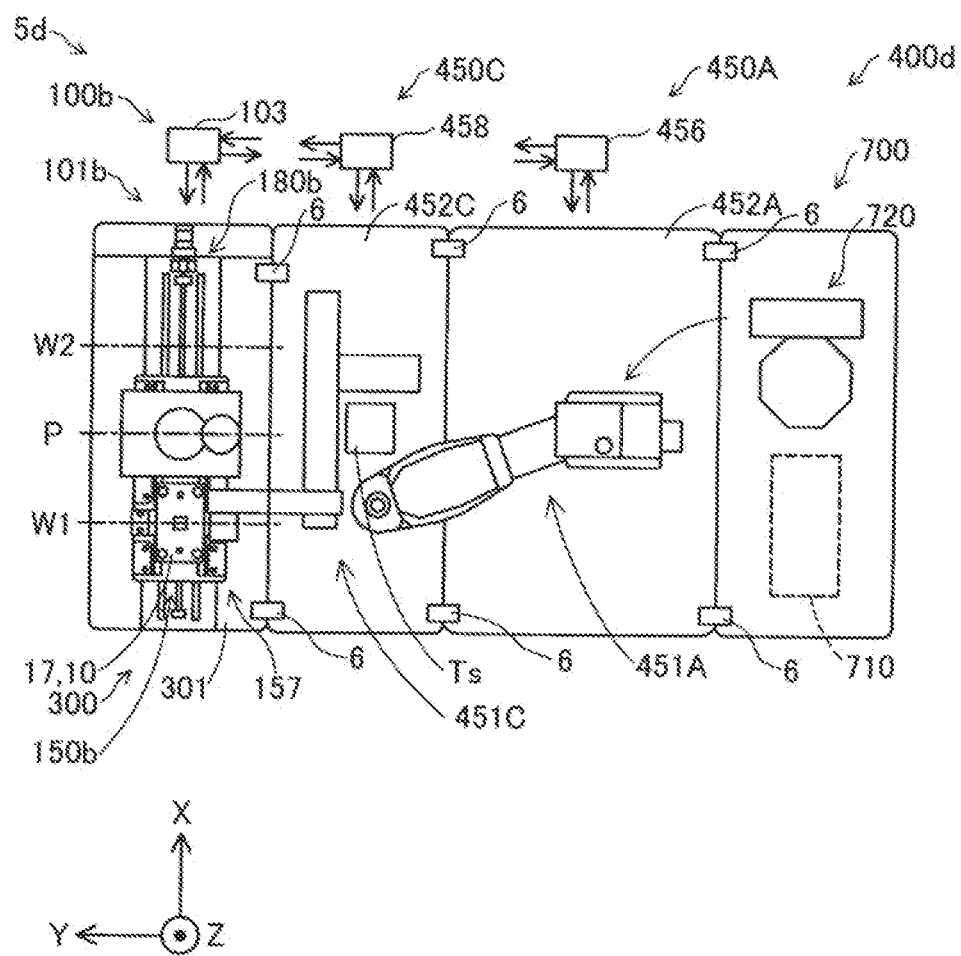
FIG. 14 is a plan view showing a schematic configuration of an injection molding system according to a fourth embodiment.

FIG. 14 is a plan view showing a schematic configuration of an injection molding system 5d according to a fourth embodiment. FIG. 14 is a top view showing the injection molding system 5d with the covers of the units removed, as FIG. 9 described in the second embodiment is. An optional unit 400d of the injection molding system 5d differs from that in the third embodiment in that the optional unit 400d includes, as the robot unit, the first robot unit 450A described in the third embodiment and a third robot unit 450C. The portions of the injection molding system 5d that are not particularly described are the same as those in the third embodiment.

The third robot unit 450C is disposed in a position adjacent to the main unit 100b in the direction –Y. The first robot unit 450A is disposed in a position adjacent to the third robot unit 450C in the direction –Y. That is, the third robot unit 450C is disposed between the main unit 100b and the first robot unit 450A in the direction Y. The ancillary instrument unit 700 is disposed in a position shifted in the direction –Y from the first robot unit 450A, as in the third embodiment. The units adjacent to each other are linked to each other via the plate-shaped members 6.

A third robot 451C is disposed in the third robot unit 450C. The third robot 451C is formed of a 3-axis orthogonally operating robot. The third robot 451C includes a fifth controller 458 and arms formed of three slide shafts along the axes X, Y, and Z. An end effector is attached to one of the arms of the third robot 451C. In the present embodiment, a suction pad is attached as the end effector to one of the arms of the third robot 451C. The fifth controller 458 is formed of a computer including a primary storage device and an input/output interface via which signals are inputted from and outputted to an external apparatus. The fifth controller 458 controls the operation of the arms and the end effector of the third robot 451C. In the present embodiment, the operation of the third robot 451C is controlled by the first controller 103 via the fifth controller 458.

The third robot 451C is installed on a third robot base 452C, which is fixed to the enclosure of the third robot unit 450C. In the present embodiment, the third robot 451C functions as the transport robot and the material supply robot, as the robot 451 in the first and second embodiments does. The first robot 451A functions as a transport robot that relays the third robot 451C that functions as the transport robot to the inspection step or the packing step.

In the present embodiment, the integrated product removed from one of the lower dies is transported by the third robot 451C that functions as the transport robot to a temporary placement table Ts provided on the third robot base 452C. The first robot 451A transports the integrated product placed on the temporary placement table Ts to the inspection apparatus or the packing apparatus via the third robot 451C.

In other embodiments, the third robot 451C is not necessarily an orthogonally operating robot and may, for example, be a horizontally articulated robot or a vertically articulated robot. The first robot 451A and the third robot 451C may be identical to each other. The end effector attached to one of the arms of the third robot 451C may include, for example, a portion that sucks the molded product and a portion that sucks the insert member, as in the case of the robot 451 in the first and second embodiments, or the end effector may be formed of a gripper.

Also in the injection molding system 5d according to the present embodiment described above, the step of transporting the integrated product removed from one lower die while insert molding is performed by using the other lower die, and the step of placing the insert member in the one lower die in the same manner can be automated, as in the second and third embodiments. The integrated product can therefore be efficiently manufactured in the injection molding system 5d. In the present embodiment, in particular, the first robot 451A disposed in the first robot unit 450A functions as the transport robot that relays the third robot 451C that functions as the transport robot and the material supply robot to the inspection step, the packaging step, and other steps carried out after the insert molding. The possibility of more efficient manufacture of the integrated product is therefore increased while the robots are controlled in a simplified manner.

In other embodiments, the optional unit 400d of the injection molding system 5d may, for example, further include the second robot unit 450B described in the third embodiment. In this case, for example, in the injection molding system 5d, the second robot unit 450B, the main unit 100b, the third robot unit 450C, the first robot unit 450A, and the ancillary instrument unit 700 are arranged in this order along the direction Y.

E. Fifth Embodiment

Figure 15:
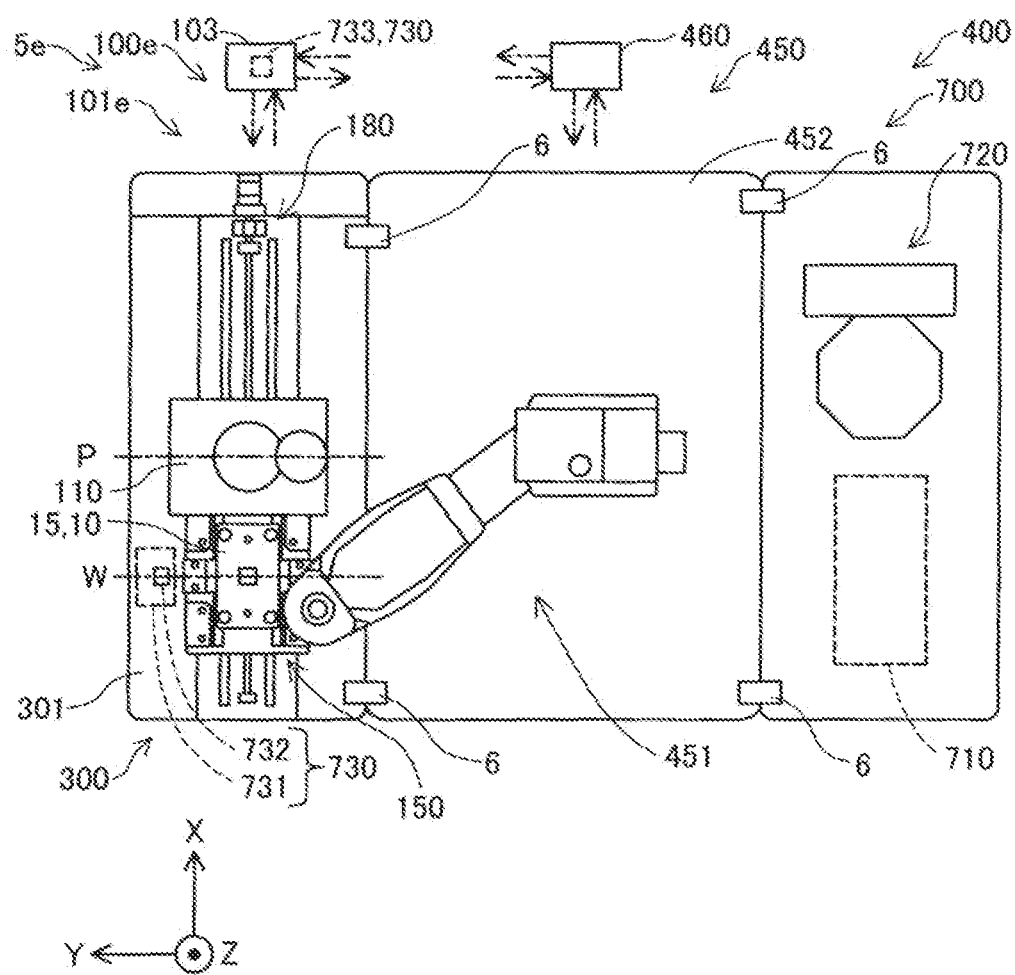
FIG. 15 is a plan view showing a schematic configuration of an injection molding apparatus according to a fifth embodiment.

FIG. 15 is a plan view showing a schematic configuration of an injection molding system 5e according to a fifth embodiment. FIG. 15 is a top view showing the injection molding system 5e with the covers of the units removed, as FIG. 2 described in the first embodiment is. The injection molding system 5e according to the present embodiment differs from that in the first embodiment in that the injection molding system 5e includes an insert detector 730, which detects whether or not the insert member has been placed in an insert position in a lower die 15e. The insert position is a predetermined position where the insert member is placed in the lower die 15e. The portions of the injection molding system 5e that are not particularly described are the same as those in the first embodiment.

Figure 16:
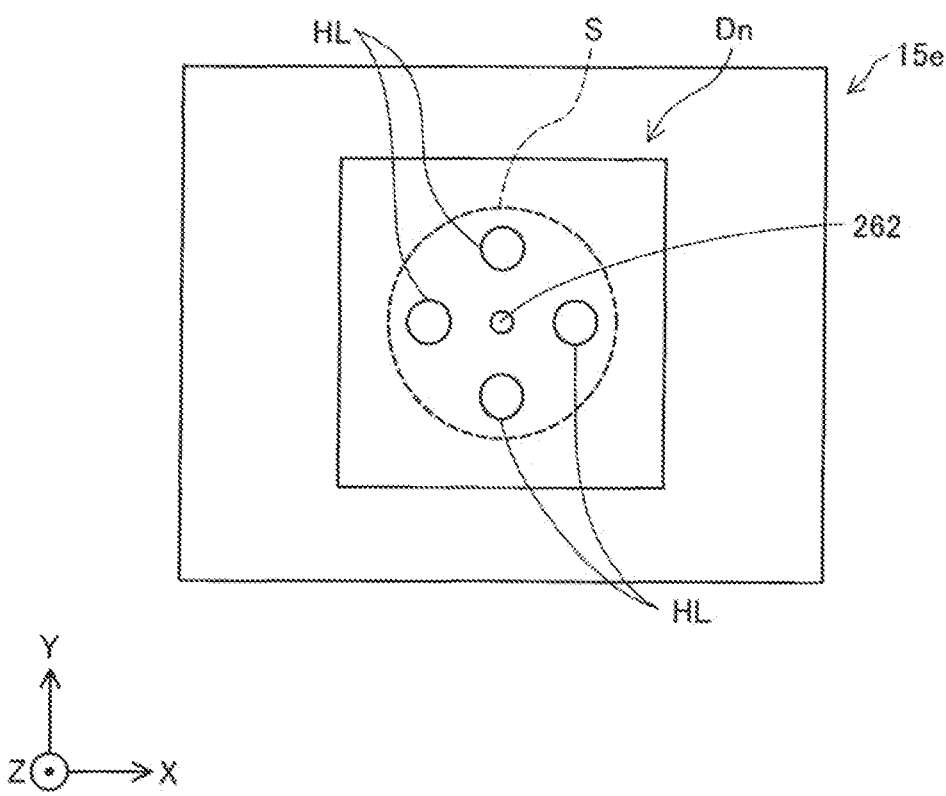
FIG. 16 is a plan view showing a central portion of a lower die in the fifth embodiment and further showing portions in the vicinity of the central portion.
Figure 17:
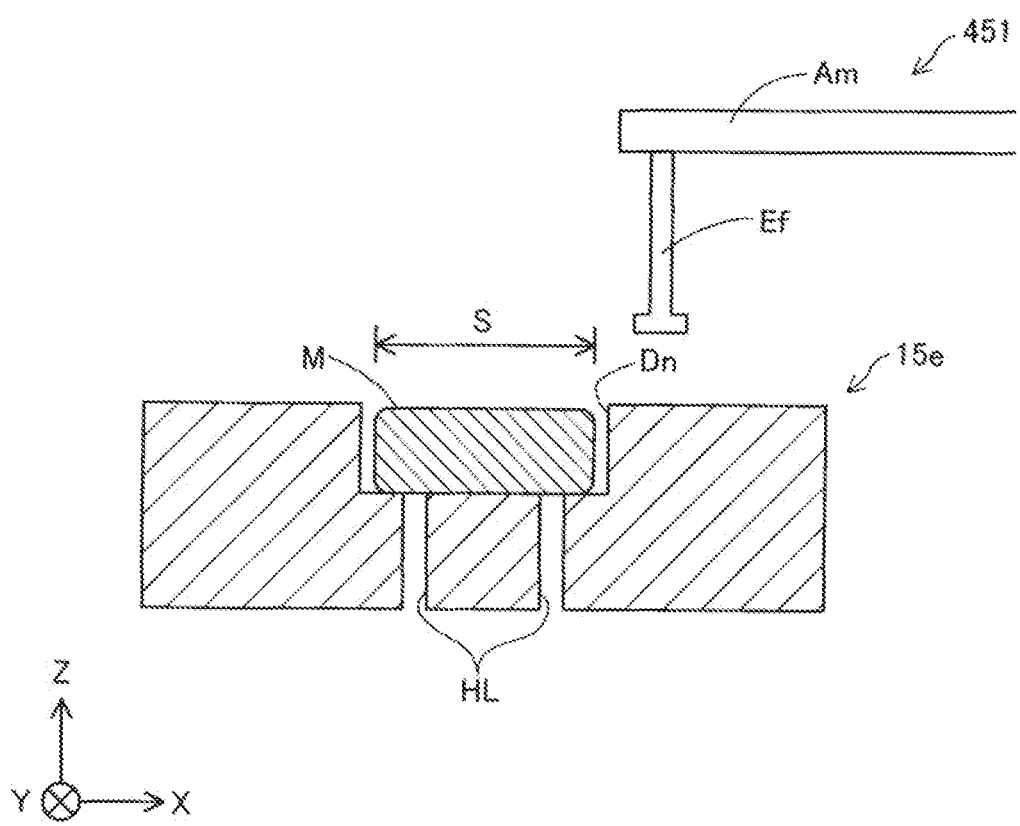
FIG. 17 describes a correct placement state.

FIG. 16 is a plan view showing a central portion, in the directions X and Y, of the lower die 15e in the fifth embodiment, and further showing portions in the vicinity of the central portion. FIG. 16 is a top view showing the central portion, in the directions X and Y, of the lower die 15e and portions in the vicinity of the central portion. FIG. 17 describes a correct placement state. The correct placement state refers to the state in which an insert member M is placed in an insert position S in the lower die 15e. FIG. 17 is a cross-sectional view of the lower die 15e and the insert member M and diagrammatically shows an arm Am and an end effector Ef of the robot 451 disposed in the robot unit 450.

In the present embodiment, the insert position S is defined as a position in the opening of a recess Dn formed in the lower die 15e, as shown in FIGS. 16 and 17. The recess Dn is a portion that defines the cavity of the molding die 10. The recess Dn may, for example, be provided with a step that positions the insert member M in the insert position S.

Figure 18:
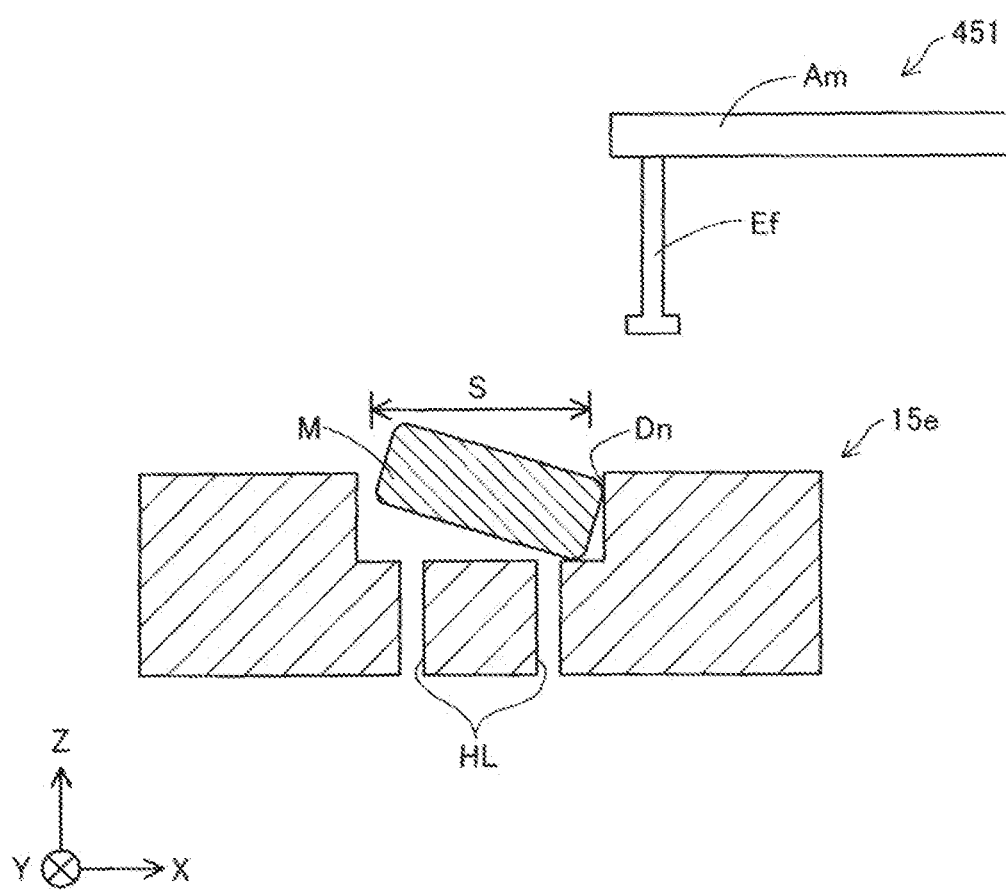
FIG. 18 describes an incorrect placement state.

Air holes HL are formed at the insert position S. In the present embodiment, four air holes HL are formed at the insert position S. The air holes HL are formed at the insert position S so as to pass through the lower die 15e in the direction Z. The air holes HL are formed in positions where the air holes HL do not overlap with a through hole into which the ejector pin 262 is inserted when viewed from above, as shown in FIG. 18. The air holes HL are closed by the insert member M placed in the insert position S, as shown in FIG. 17.

In the present embodiment, the insert detector 730 is provided in a first injection molding machine 101e of a main unit 100e, as shown in FIG. 15. The insert detector 730 in the present embodiment includes a suction section 731, a measurement section 732, and a detection section 733. The suction section 731 is a member configured to be capable of sucking air at the insert position S through the air holes HL shown in FIGS. 16 and 17. In the present embodiment, the suction section 731 is formed of a suction pump and sucks air at the insert position S into the suction section 731 through the air holes HL and tubes that are not shown but are coupled to the air holes HL. The measurement section 732 measures the flow rate or pressure of the air sucked by the suction section 731. In the present embodiment, the measuring section 732 is formed of a flow meter that measures the flow rate of the air. In other embodiments, the measurement section 732 may be formed, for example, of a pressure gauge that measures the pressure of the air. The detection section 733 detects whether or not the correct placement state has been achieved based on the air flow rate or pressure measured by the measurement section 732. In the present embodiment, the first controller 103 functions as the detection section 733.

FIG. 18 describes an incorrect placement state. The incorrect placement state refers to the state in which the insert member M is placed in a position different from the insert position S in the lower die 15e. FIG. 18 is a cross-sectional view of the lower die 15e and the insert member M and diagrammatically shows the arm Am and the end effector Ef of the robot 451, as FIG. 17 is.

In the state shown in FIG. 18, since the air holes HL are not closed by the insert member M, the flow rate of the air sucked by the suction section 731 and measured by the measurement section 732 is greater than that in the correct placement state shown in FIG. 17. For example, also when only part of the air holes HL is covered by the insert member M, a large air flow rate is measured by the measurement section 732. The first controller 103 that functions as the detection section 733 can therefore detect whether or not the correct placement state has been achieved based on the difference between the air flow rate measured by the measurement section 732 and the air flow rate in the correct placement state. The air flow rate in the correct placement state can be determined in advance, for example, by an experiment. Even when the measurement section 732 is formed of a pressure gauge that measures the pressure of the air, the detection section 733 can similarly detect whether or not the correct placement state has been achieved based on the difference between the measured pressure and the pressure in the correct placement state.

In the present embodiment, the robot 451 that functions as the material supply robot places the insert member M in the insert position S in the placement operation based on the result of the detection performed by the insert detector 730. In more detail, the robot 451 in the present embodiment operates the arm Am to place the insert member M sucked by the end effector Ef in the lower die 15e, and then, when the insert detector 730 detects that the correct placement state has not been achieved, the robot 451 moves the insert member M placed in the lower die 15e to adjust the position of the insert member M. Thereafter, for example, when the insert detector 730 detects again that the correct placement state has not been achieved, the robot 451 adjusts the position of the insert member M again. The robot 451 repeatedly adjusts the position of the insert member M as described above until the insert detector 730 detects that the correct placement state has been achieved. The insert member M is thus placed in the insert position S. The first controller 103 may, for example, start detecting whether or not the correct placement state has been achieved after the insert member M is placed in the lower die 15e by the robot 451, or may, for example, control the robot 451, while keeping detecting whether or not the correct placement state has been achieved, not to adjust the position of the insert member M after the placement operation is completed until the next placement operation is started. The arm Am of the robot 451 may be provided, for example, with a contact-type sensor, a non-contact-type laser sensor, a camera, or any other component that detects the insert member M placed in the lower die 15e. The robot 451 can thus more efficiently adjust the position of the insert member M.

When detecting that the correct placement state has not been achieved, the first controller 103 may, for example, inform the user that the correct placement state has not been achieved via a notifier that is not shown. In this case, the notifier may, for example, be a display section formed of a liquid crystal panel or any other component that displays visual information, or a speaker or any other component that issues audio information.

The injection molding system 5e according to the present embodiment described above also allows space saving as compared with the case where the units or the apparatuses are separately installed, with the degree of freedom of customization of the injection molding system 5e increased. In the present embodiment, in particular, the injection molding system 5e includes the insert detector 730, which detects whether or not the insert member M has been placed in the insert position S. The injection molding system 5e can therefore use the insert detector 730 to detect whether or not the insert member M has been placed in the insert position S. A situation in which the injection molding is performed with the insert member M placed in a position different from the insert position S can therefore be avoided, whereby damage to the molding die 10, the injector 110, and other components installed in the first injection molding machine 101*e* and production of defective products can be avoided.

In the present embodiment, the robot 451 disposed in the robot unit 450 places the insert member M in the insert position S based on the result of the detection performed by the insert detector 730 in the placement operation. The robot 451 can thus adjust the position of insert member M in such a way that the insert member M is located in the insert position S while placing the insert member M in the lower die 15*e* in the placement operation. The insert member M can therefore be placed in the insert position S without adjustment of the position of the insert member M by using, for example, a robot or an apparatus different from the robot 451 after the placement operation, whereby the integrated product can be more efficiently manufactured in the injection molding system 5*e*.

Figure 19:
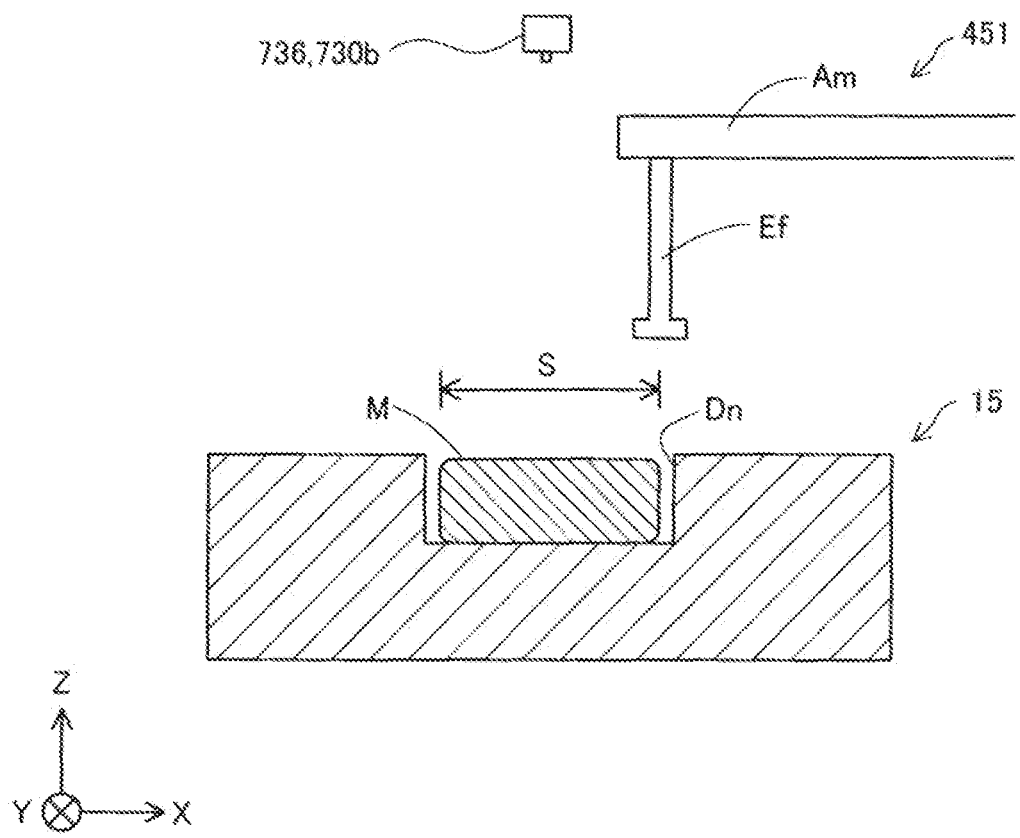
FIG. 19 is a diagrammatic view for describing an insert detector in another embodiment.

FIG. 19 is a diagrammatic view for describing an insert detector 730*b* in another embodiment. FIG. 19 is a cross-sectional view of the lower die 15 and the insert member M and diagrammatically shows the arm Am and the end effector Ef of the robot 451, as FIG. 17 is. The insert detector 730*b* shown in FIG. 19 does not include the suction section 731, the measurement section 732, or the detection section 733, but includes a camera 736, which captures images of the recess Dn of the lower die 15 and portions in the vicinity of the recess Dn. In the aspect shown in FIG. 19, the first controller 103 detects whether or not the correct placement state has been achieved by analyzing the images captured by the camera 736. The camera 736 is disposed, for example, in a position where the camera 736 faces the lower die 15 located in the standby position W. The camera 736 may be fixed, for example, to the enclosure of the main unit 100, the base 300, or the injector 110. When the first injection molding machine 101 is configured to be capable of switching the first state to the second state and vice versa, as in the second to fourth embodiments, it is more preferable that the camera 736 is disposed both in the position where the camera 736 faces the second lower die 17 located in the first standby position W1 and the position where the camera 736 faces the first lower die 16 located in the second standby position W2. The insert detector 730*b* can thus detect whether or not the insert member M has been placed in the insert position S both in the first standby position W1 and the second standby position W2.

Figure 20:
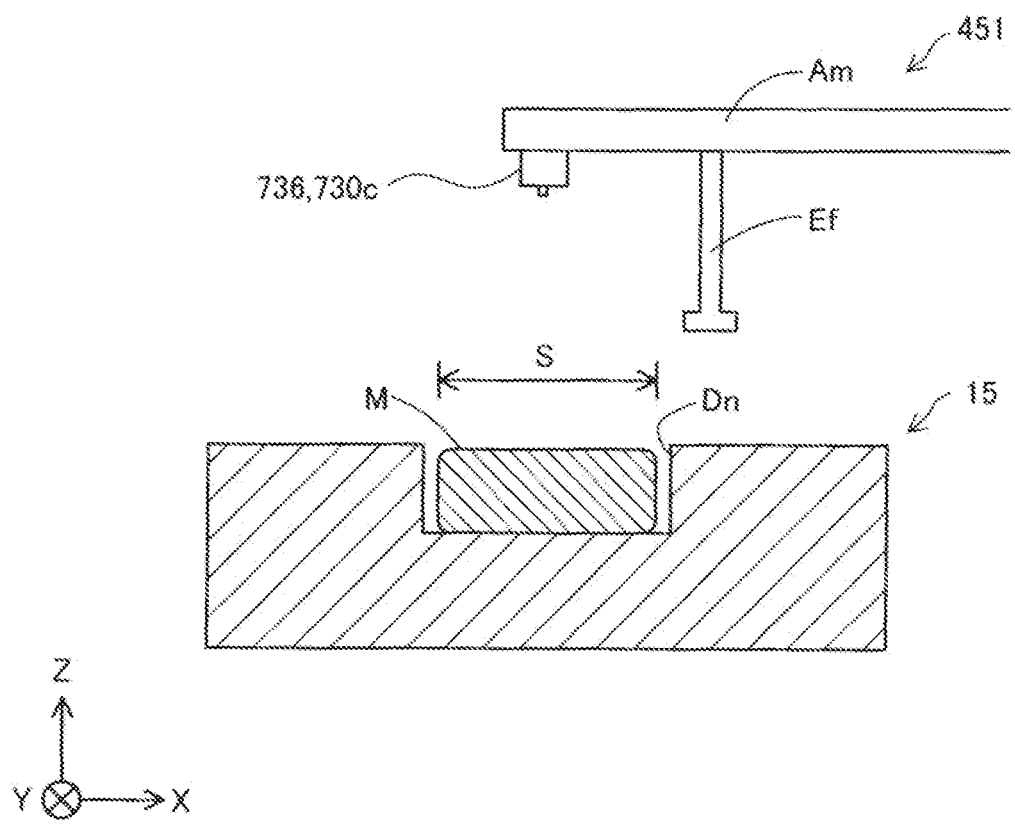
FIG. 20 is a diagrammatic view for describing an insert detector in another embodiment.

FIG. 20 is a diagrammatic view for describing an insert detector 730*c* in another embodiment. FIG. 20 is a cross-sectional view of the lower die 15 and the insert member M and diagrammatically shows the arm Am and the end effector Ef of the robot 451, as FIGS. 17 and 19 are. The insert detector 730*c* includes the camera 736. In the aspect shown in FIG. 20, the camera 736 is fixed to the arm Am of the robot 451. In the form shown in FIG. 20, image analysis is used to detect whether or not the correct placement state has been achieved, as in the aspect shown in FIG. 19. The image analysis may be performed, for example, by the first controller 103 or the second controller 455. In the form described above, the first controller 103 controls the robot 451 in the placement operation to place the insert member M in the lower die 15 by the end effector Ef attached to the arm Am, then detects whether or not the correct placement state has been achieved based, for example, on the result of the detection performed, for example, by a sensor attached to the arm Am, and when the first controller 103 determines that the correct placement state has not been achieved, the position of the insert member M can be adjusted again by the end effector Ef. The integrated product can therefore be more efficiently manufactured without damage to the molding die 10 and the injector 110 or production of defective products. Even when the first injection molding machine 101 is configured to be capable of switching the first state to the second state and vice versa as in the second to fourth embodiments, whether or not the insert member M has been placed in the insert position S can be detected in both the first standby position W1 and the second standby position W2 without installation of a plurality of sensors and other components that form the insert detector 730*c*.

The insert detector 730*c* may not be configured to suck air or include the camera 736 as described above. For example, the insert detector 730*c* may include a contact-type or non-contact-type sensor that measures the distance to the lower die 15, or a contact-type detection sensor that detects contact with the lower die 15, and the insert detector 730*c* may detect whether or not the correct placement state has been achieved based on the values detected by any of the sensors. In this case, any of the sensors may be fixed, for example, to the enclosure of the main unit 100, the base 300, or the injector 110, or the robot 451 of the robot unit 450 may be provided with any of the sensors, like the camera 736 described with reference to FIG. 20.

F. Sixth Embodiment

Figure 21:
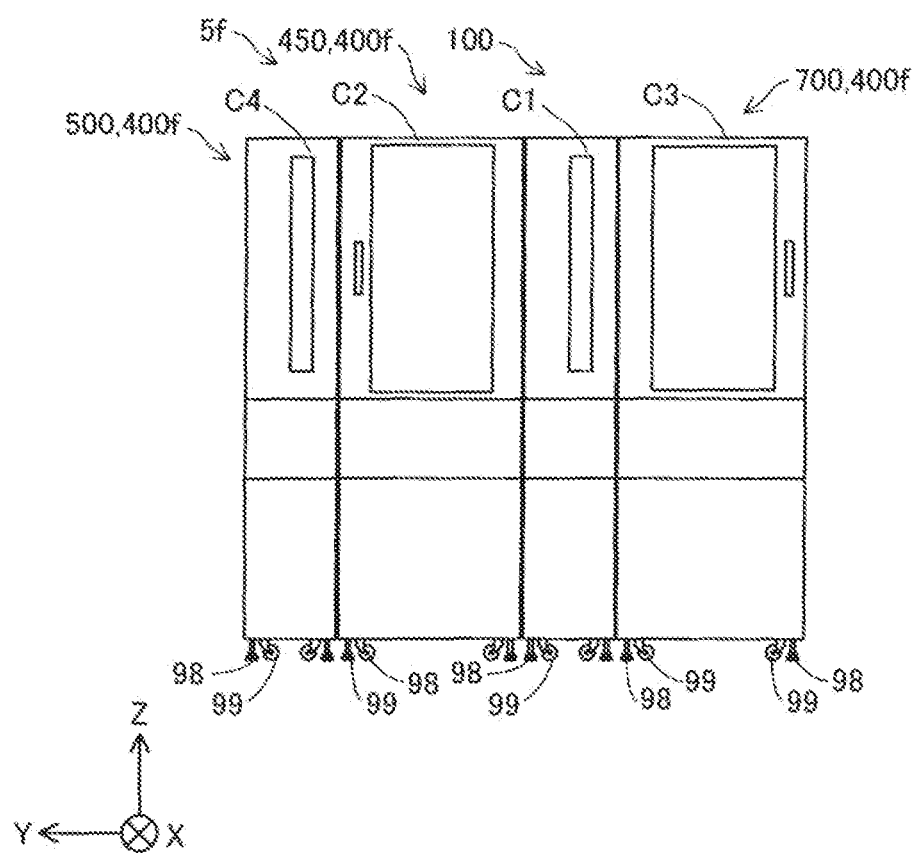
FIG. 21 is a front view showing a schematic configuration of an injection molding system according to a sixth embodiment.
Figure 22:
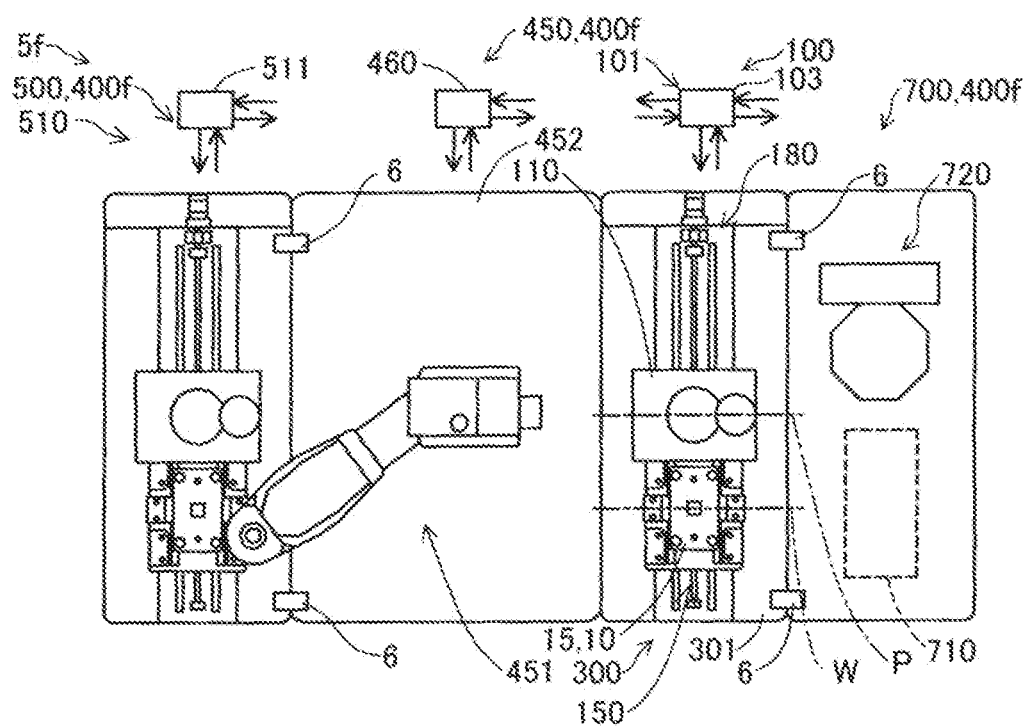
FIG. 22 is a plan view showing the schematic configuration of the injection molding system according to the sixth embodiment.

FIG. 21 is a front view showing a schematic configuration of an injection molding system 5*f* according to a sixth embodiment. FIG. 22 is a plan view showing the schematic configuration of the injection molding system 5*f*. FIG. 22 is a top view showing the injection molding system 5*f* with the covers of the units removed, as FIG. 1 described in the first embodiment is. Unlike the first embodiment, an optional unit 400*f* of the injection molding system 5*f* according to the present embodiment includes a member molding unit 500. The portions of the injection molding system 5*f* that are not particularly described are the same as those in the first embodiment.

The optional unit 400*f* includes the member molding unit 500 described above and further includes the robot unit 450 and the ancillary instrument unit 700, as in the first embodiment, as shown in FIG. 21. In FIG. 21, the circumference of the member molding unit 500 is covered with a fourth cover C4, as the circumference of each of the other units is covered with a cover.

In the present embodiment, the robot unit 450 is disposed in a position adjacent to the main unit 100 in the direction +Y. The member molding unit 500 is disposed in a position adjacent to the robot unit 450 in the direction +Y. The ancillary instrument unit 700 is disposed in a position adjacent to the main unit 100 in the direction −Y. The units adjacent to each other are linked to each other via the plate-shaped members 6, as shown in FIG. 22. The main unit 100 and the member molding unit 500 can instead be linked to each other via the plate-shaped members 6 when the two units are adjacent to each other.

A second injection molding machine 510 is disposed in the member molding unit 500 in the present embodiment, as shown in FIG. 22. The second injection molding machine 510 injects a second molding material to mold the insert member described above. The second molding material is produced, for example, by plasticizing a resin material that has a color and a composition different from those of the material used to produce the first molding material. The second injection molding machine 510 in the present embodiment differs from the first injection molding machine 101 in that the second injection molding machine 510 injects the second molding material and molds the insert member, but the configuration of each portion of the second injection molding machine 510 is the same as that of the first injection molding machine 101. The second injection molding machine 510 is controlled by the first controller 103 via a sixth controller 511 provided in the second injection molding machine 510. The ancillary instrument unit 700 may include, for example, an apparatus that feeds the material to the second injection molding machine 510 and an apparatus that adjusts the temperature of the molding die used in the second injection molding machine 510.

The robot 451 disposed in the robot unit 450 in the present embodiment does not function as the transport robot but functions only as the material supply robot, unlike in the first embodiment. The robot 451 in the present embodiment performs the operation of placing the insert member molded by the member molding unit 500 in the lower die 15 as the placement operation. In more detail, the robot 451 sucks the insert member molded by the second injection molding machine 510 of the member molding unit 500, transports the insert member to the lower die 15 located in the standby position W in the first injection molding machine 101 of the main unit 100, and places the insert member in the lower die 15.

The injection molding system 5f according to the present embodiment described above also allows space saving as compared with the case where the units or the apparatuses are separately installed, with the degree of freedom of customization of the injection molding system 5f increased. In the present embodiment, in particular, the robot unit 450 is disposed in a position adjacent to the main unit 100, the member molding unit 500 is disposed in a position adjacent to the robot unit 450, and the robot 451 performs the operation of placing the insert member molded by the member molding unit 500 in the lower die 15 as the placement operation. Therefore, since the robot unit 450 is disposed in a position adjacent to the main unit 100 and the member molding unit 500, the robot 451 disposed in the robot unit 450 can efficiently transport the insert member molded by the member molding unit 500 to the lower die 15 installed in the first injection molding machine 101 of the main unit 100 and place the insert member in the lower die 15. Therefore, in the injection molding system 5f, the step of molding the insert member to the step of molding the integrated product by using the molded insert member can be automated and efficiently carried out, whereby the integrated product can be more efficiently manufactured.

In other embodiments, the member molding unit 500 may, for example, include a press molding machine that molds the insert member in press molding in place of the second injection molding machine 510. The optional unit 400f may further include, for example, a robot unit in which a transport robot that transports the integrated product molded by the main unit 100 is disposed.

G. Seventh Embodiment

Figure 23:
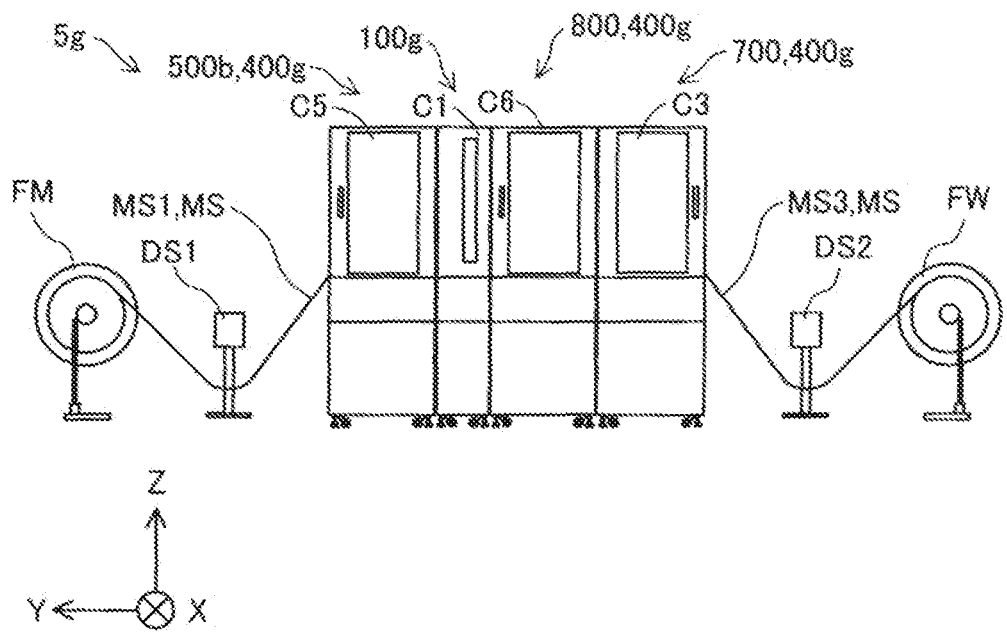
FIG. 23 is a front view showing a schematic configuration of an injection molding system according to a seventh embodiment.
Figure 24:
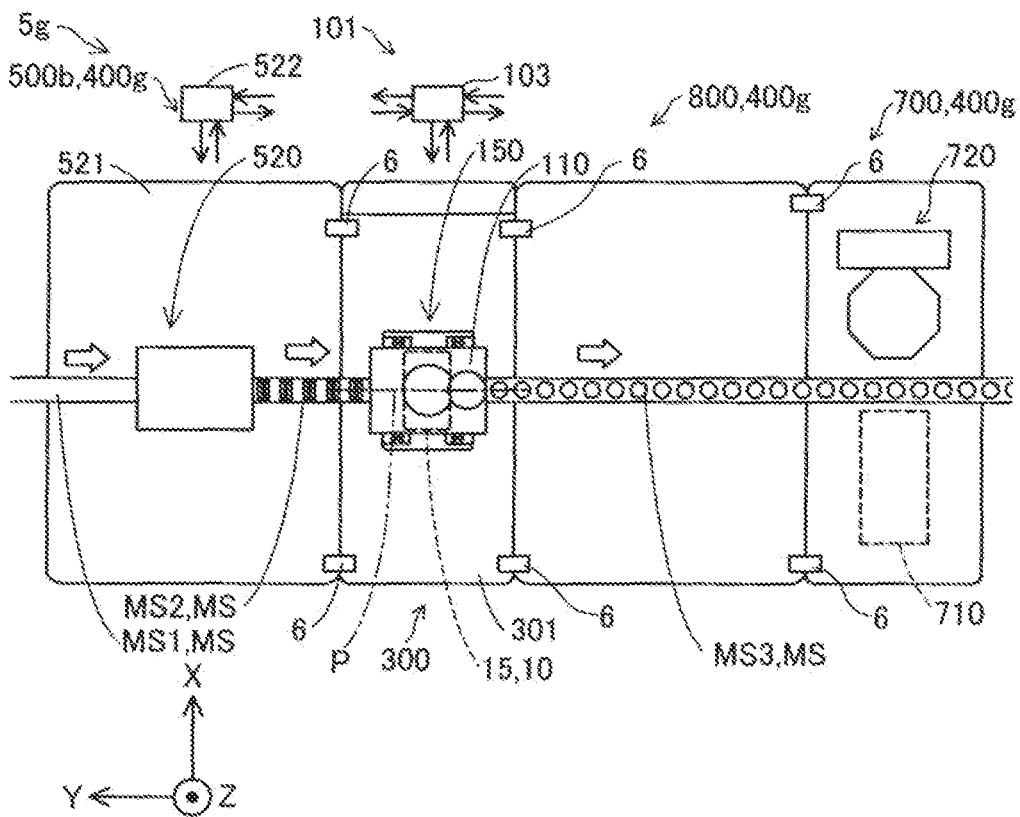
FIG. 24 is a plan view showing the schematic configuration of the injection molding system according to the seventh embodiment.

FIG. 23 is a front view showing a schematic configuration of an injection molding system 5g according to a seventh embodiment. FIG. 24 is a plan view showing the schematic configuration of the injection molding system 5g. FIG. 24 is a top view showing the injection molding system 5g with the covers of the units removed, as FIG. 1 described in the first embodiment is. An optional unit 400g of the injection molding system 5g according to the present embodiment includes a member molding unit 500b, unlike in the first embodiment. The portions of the injection molding system 5g that are not particularly described are the same as those in the first embodiment.

The optional unit 400g includes the member molding unit 500b described above, the ancillary instrument unit 700, and an inspection unit 800, but does not include the robot unit 450, unlike in the first embodiment, as shown in FIG. 23. In FIG. 23, the circumference of the member molding unit 500b is covered with a fifth cover C5, and the circumference of the inspection unit 800 is covered with a sixth cover C6.

In the present embodiment, the member molding unit 500b is disposed in a position adjacent to a main unit 100g in the direction +Y. The inspection unit 800 is disposed in a position adjacent to the main unit 100g in the direction −Y. The ancillary instrument unit 700 is disposed in a position adjacent to the inspection unit 800 in the direction −Y. The units adjacent to each other are linked to each other via the plate-shaped members 6.

A press molding machine 520, which molds the insert member in press molding, is disposed in the member molding unit 500b in the present embodiment, as shown in FIG. 24. The press molding machine 520 is disposed on a press base 521 fixed to the enclosure of the member molding unit 500b. The press molding machine 520 in the present embodiment forms a plurality of insert members in a sheet material MS having the shape of a sheet by punching out part of the sheet material MS in such a way that the plurality of insert members are continuously arranged along the longitudinal direction of the sheet material MS. In the present embodiment, the sheet material MS is made of a metal material. The press molding machine 520 includes a seventh controller 522, which is formed of a computer, as the first controller 103 is. The operation of the press molding machine 520 is controlled by the first controller 103 via the seventh controller 522.

A first injection molding machine 101g disposed in the main unit 100g in the present embodiment performs insert molding by injecting the first molding material into the cavity in which the insert members formed in the sheet material MS are placed to mold integrated products formed of the insert members and the first molding material integrated with each other. A plurality of integrated products are so formed in the sheet material MS that the plurality of integrated products are continuously arranged along the longitudinal direction of the sheet material MS. In the following description, the sheet material MS before the insert members are formed is called a first sheet MS1, the sheet material MS after the insert members are formed but before the integrated products are formed is called a second sheet MS2, and the sheet material after the integrated products are formed is called a third sheet MS3 in some cases. The sheet material MS is called a hoop material in some cases. An approach for performing insert molding using a hoop material with insert members formed therein is called hoop molding or chain mold molding in some cases.

The first injection molding machine 101g in the present embodiment does not include the position changer 180, unlike in the first embodiment, and the lower die 15 installed in the first injection molding machine 101g is always located in the injection position P. The ejector in the present embodiment is configured to be capable of removing the integrated products from the lower die 15 located in the injection position P. In FIG. 24, the lower die 15 installed in the first injection molding machine 101g is located under the injector 110 and is drawn with the broken line.

The lower die 15 in the present embodiment may be provided, for example, with positioning pins that position the insert members with respect to the molding die 10. In this case, the positioning pins are configured to be insertable into positioning holes formed, for example, in positions corresponding to portions of the sheet material MS where the insert members are formed. The positioning holes are formed, for example, by the press molding machine 520 in the sheet material MS in positions where the positioning holes do not overlap with the insert members simultaneously with the molding of the insert members.

The inspection apparatus that is not shown is disposed in the inspection unit 800. The inspection apparatus visually inspect the integrated products under the control of the first controller 103. In other embodiments, for example, an inspection robot that visually inspects the integrated products may be disposed in the inspection unit 800. The inspection apparatus or the inspection robot may be disposed in a unit different from the inspection unit 800, or the inspection apparatus or the inspection robot may not be disposed in any of the units, and no visual inspection on the integrated products may be performed in the injection molding system 5g.

The injection molding system 5g according to the present embodiment includes, in addition to the units described above, an unwinder FM, which causes the rolled first sheet MS1 to rotate and unwinds the rolled first sheet MS1, and a winder FW, which causes the third sheet MS3 to rotate and winds the third sheet MS3 into a roll, as shown in FIG. 23. The unwinder FM and the winder FW are disposed so as to sandwich the main unit 100g and the optional unit 400g in the direction Y. A contact-type deflection sensor DS1, which detects deflection of the sheet material MS with the aid of two bars that are not shown, is provided between the unwinder FM and the unit of the main unit 100g and the optional unit 400g, and a deflection sensor DS2 similar to the deflection sensor DS1 is provided between the winder FW and the unit of the main unit 100g and the optional unit 400g. In the present embodiment, the winder FW is driven to cause the unwinder FM to unwind the first sheet MS1 and the winder FW itself to wind the third sheet MS3. The winder FW is driven under the control of the first controller 103. In the present embodiment, the first controller 103 adjusts the amount of third sheet MS3 to be wound by the winder FW by referring to the deflection of the first sheet MS1 detected by the deflection sensor DS1 and the deflection of the third sheet MS3 detected by the deflection sensor DS2. Note that the unwinder FM, the winder FW, and the deflection sensors DS1 and DS2 are omitted in FIG. 24. In other embodiments, the deflection sensors DS1 and DS2 may each be formed, for example, of a non-contact-type deflection sensor, or the deflection sensor DS1 or DS2 may not be provided in the injection molding system 5g.

In the present embodiment, the integrated products are continuously manufactured while the sheet material MS is transported in the direction +Y from the unwinder FM toward the winder FW, as shown in FIG. 24. First, the first sheet MS1 unwound from the unwinder FM is sent to the press molding machine 520 disposed in the member molding unit 500b. The press molding machine 520 form the insert members in the first sheet MS1 sent to the press molding machine 520. The second sheet MS2, in which the insert members are formed, is then sent to the first injection molding machine 101g in the main unit 100g. The first injection molding machine 101g forms the integrated products by using the insert members formed in the second sheet MS2 sent to the first injection molding machine 101g. The third sheet MS3, in which the integrated products are formed, is then sent to the inspection unit 800, where the third sheet MS3 undergoes visual inspection and is then wound up by the winder FW.

In other embodiments, for example, the unwinder FM may be driven or both the unwinder FM and the winder FW may be driven to unwind the first sheet MS1 from the unwinder FM and wind the third sheet MS3 around the winder FW. The winder FW may not be provided. For example, a cutter that cuts the third sheet MS3 into individual integrated products may be provided, and the sheet material MS may be transported from the unwinder FM toward the cutter. In this case, for example, the unwinder FM may be driven to transport the sheet material MS from the unwinder FM toward the cutter, or an air-driven or motorized feeder may transport the sheet material MS from the unwinder FM toward the cutter. When the optional unit 400g of the injection molding system 5g includes the robot unit 450 as in the first embodiment, for example, the integrated products cut by the cutter may be transported by the robot 451 that functions as the transport robot, for example, to an inspection apparatus.

The member molding unit 500b and the main unit 100g are not necessarily adjacent to each other. For example, a unit different from the member molding unit 500b and the main unit 100g may be disposed therebetween. In this case, it is preferable that the unit disposed between the member molding unit 500b and the main unit 100g is a unit that does not hinder the movement of the sheet material MS transported from the member molding unit 500b toward the main unit 100g.

The injection molding system 5g according to the present embodiment described above also allows space saving as compared with the case where the units or the apparatuses are separately installed, with the degree of freedom of customization of the injection molding system 5g increased. In the present embodiment, in particular, the member molding unit 500b, in which the press molding machine 520 is disposed, is disposed in a position adjacent to the main unit 100g, and the press molding machine 520 forms a plurality of the insert members in the sheet material MS by punching out part of the sheet material MS. The configuration described above allows continuous molding of a plurality of integrated products by feeding the sheet material MS in which the insert members have been formed by the press molding machine 520 from the press molding machine 520 to the first injection molding machine 101g and causing the first injection molding machine 101g to mold the integrated products formed of the first molding material integrated with the insert members formed in the sheet material MS. The step of molding the insert members to the step of molding the integrated products by using the molded insert members can therefore be efficiently carried out in the injection molding system 5g, whereby the integrated products can be more efficiently manufactured.

Figure 25:
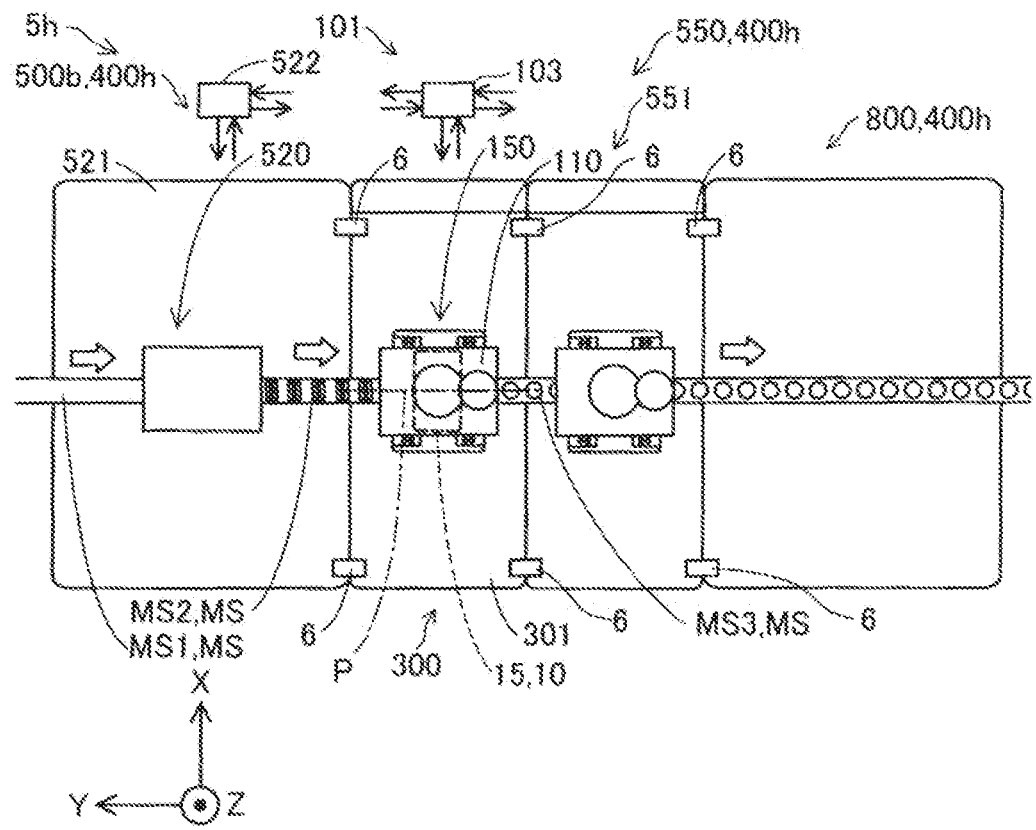
FIG. 25 is a plan view showing a schematic configuration of an injection molding system according to another embodiment.

FIG. 25 is a plan view showing a schematic configuration of an injection molding system 5h according to another embodiment. FIG. 25 is a top view showing the injection molding system 5h with the covers of the units removed, as FIG. 24 described above is. In FIG. 25, the ancillary instrument unit 700 is omitted. An optional unit 400h of the injection molding system 5h further includes a molding unit 550 in addition to the units provided in the optional unit 400g described in the seventh embodiment. The molding unit 550 is disposed in a position adjacent to the main unit 100g in the direction -Y. A third injection molding machine 551, which performs insert molding by using the integrated products molded in the main unit 100g as the insert members, is disposed in the molding unit 550. The third injection molding machine 551 is formed, for example, of an injection molding machine similar to the first injection molding machine 101g. The third injection molding machine 551 uses, for example, a molding die having a cavity defined so as to be larger than the cavity of the molding die 10 used in the first injection molding machine 101g, and a resin material having a color and a composition different from those of the material for producing the first molding material is plasticized and the resultant molding material is injected under the control of the first control unit 103. The aspect described above also allows the step of molding the insert members to the step of molding the integrated products by using the molded insert members to be efficiently carried out in the injection molding system 5h, whereby the integrated products can be more efficiently manufactured. The molding unit 550 may be provided, for example, in the optional unit of the injection molding systems described in any of the first to sixth embodiments.

H. Eighth Embodiment

Figure 26:
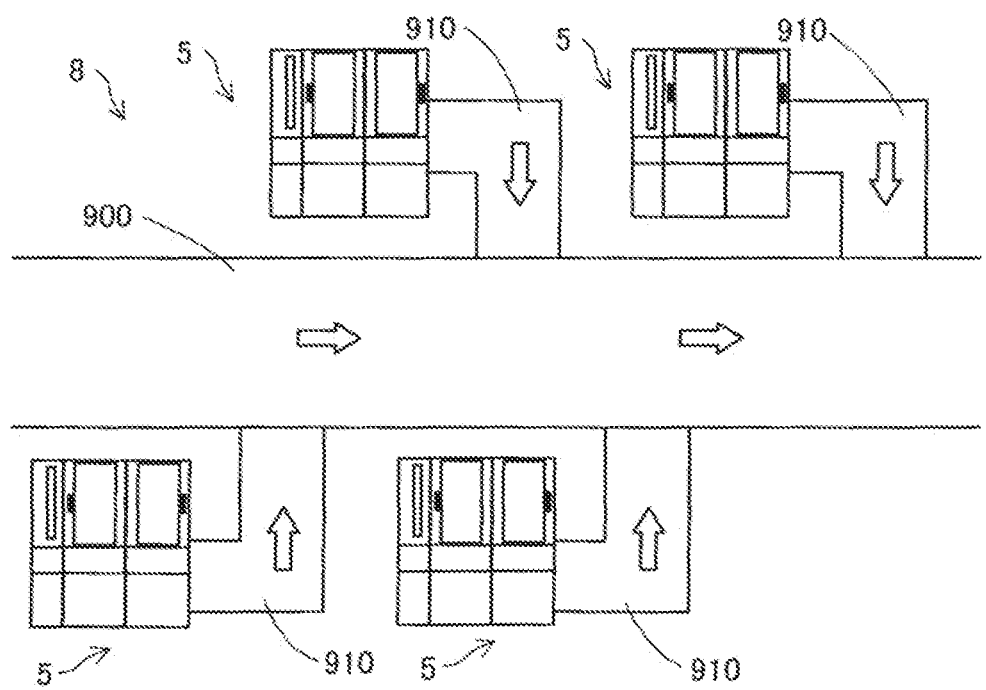
FIG. 26 shows a schematic configuration of a manufacturing system as an eighth embodiment.

FIG. 26 shows a schematic configuration of a manufacturing system 8 as an eighth embodiment. The manufacturing system 8 according to the present embodiment includes the injection molding systems 5 described above, an assembly line 900, which assembles final products using the integrated products, and transfer sections 910, which each transfer the integrated products manufactured by the corresponding injection molding system 5 from the injection molding system 5 to the assembly line 900. In the present embodiment, the manufacturing system 8 includes four injection molding systems 5 and four transfer sections 910, which each transfer the integrated products from the corresponding injection molding system 5. In the present embodiment, the assembly line 900 is formed of a belt conveyor that transports the integrated products. That is, in the present embodiment, the final products are manufactured while being transported by the belt conveyor, which forms the assembly line 900. The assembly of final products in the assembly line 900 may, for example, be performed by robots or by hand.

In the present embodiment, the transfer section 910 is formed of a belt conveyor that connects each of the injection molding systems 5 to the assembly line 900. The integrated products having undergone visual inspection are placed on the transfer section 910, for example, by the robot unit 450 described with reference to FIG. 2. The belt conveyor, which forms the transfer section 910, is then driven to transfer the integrated products placed on the transfer section 910 to the assembly line 900. In other embodiments, the transfer section 910 may be provided, for example, in the optional unit 400 of the injection molding system 5, or may be formed of a robot that transfers the integrated products to the assembly line 900, such as an autonomously traveling robot.

The number of injection molding systems 5 provided in the manufacturing system 8 may be one, two or three, or five or more. The aspect of the injection molding system 5 can be any of the aspects described in the first to seventh embodiments. When the manufacturing system 8 includes a plurality of injection molding systems 5, as in the present embodiment, the configuration of each of the injection molding systems 5 may be partially or fully the same or different from each other.

The manufacturing system 8 according to the present embodiment described above also allows space saving as compared with the case where the units or the apparatuses are separately installed, with the degree of freedom of customization of the injection molding system 5 increased. Furthermore, in the manufacturing system 8, the integrated products manufactured by the injection molding systems 5 can be gathered onto the assembly line 900, and the final products using the integrated products can be efficiently manufactured.

I. Other Embodiments (I-1) In the embodiments described above, the first injection molding machine 101 uses a flat screw to plasticize the material to produce the first molding material. In contrast, the first injection molding machine 101 may, for example, plasticize the material by rotating an in-line screw to produce the molding material.

(I-2) In the embodiments described above, the injector 110, the upper die 11, and the lower die 15 are arranged sequentially from above in the vertical direction in the first injection molding machine 101. In contrast, the injector 110, the upper die 11, and the lower die 15 may not be arranged sequentially from above in the vertical direction in the first injection molding machine 101. For example, the injector 110, the upper die 11, and the lower die 15 may be arranged in this order along the horizontal direction. Instead, with respect to the upper die 11 and the lower die 15 arranged along the vertical direction, the injector 110 may be disposed along the vertical direction or a direction that intersects with the vertical and horizontal directions. When the upper die 11 and the lower die 15 are arranged along the horizontal direction, the insert member is placed, for example, in a recess or a depression formed in the portion that defines the cavity of the upper die 11 or the lower die 15. In this case, the robot 451 that functions as the material supply robot places, as the placement operation, the insert member, for example, in the recess or the depression formed in the upper die 11 or the lower die 15.

(I-3) In the embodiments described above, the die clamper 200 performs the die clamping and die opening by moving the injector 110 and the upper die 11 along the vertical direction. In contrast, the die clamper 200 may perform the die clamping and die opening by moving the lower die 15 along the vertical direction.

(I-4) In the embodiments described above, the position changer 180 linearly moves the lower die support 150 along the direction X. In contrast, the position changer 180 may not linearly move the lower die support 150. For example, the position changer 180 may be formed of what is called a rotary table that moves the lower die support 150 so as to draw a circular trajectory when viewed along the vertical direction.

(I-5) In the embodiments described above, the first support 156 and the second support 157 are configured as part of the pair of blocks 152b, which form the lower die support 150b. In contrast, the first support 156 and the second support 157 may not be configured as part of the blocks 152b. For example, the first support 156 and the second support 157 may be configured as separate holders that hold the first lower die 16 and the second lower die 17. In this case, the position changer 180 may, for example, be configured to be capable of separately moving the first support 156 and the second support 157, and may switch the first state to the second state and vice versa by separately moving the first support 156 and the second support 157.

(I-6) In the embodiments described above, the second injection molding machine 510 and the third injection molding machine 551 are each formed of the same injection molding machine as the first injection molding machine 101. In contrast, the configuration of each of the second injection molding machine 510 and the third injection molding machine 551 may differ from that of the first injection molding machine 101. For example, the upper die 11 and the lower die 15 may be arranged along the vertical direction in the first injection molding machine 101, and the upper and lower dies may be arranged along the horizontal direction in the second injection molding machine 510 and the third injection molding machine 551. The first injection molding machine 101 may be configured as an injection molding machine including a flat screw, and the second injection molding machine 510 and the third injection molding machine 551 may each be configured as an injection molding machine including an inline screw in place of a flat screw.

(I-7) In the embodiments described above, the optional unit 400 includes the ancillary instrument unit 700. In contrast, the optional unit 400 may not include the ancillary instrument unit 700. In this case, the die temperature adjuster 710 and the material feeder 720 may be provided in another unit, for example, the main unit 100.

(I-8) In the embodiments described above, the dimensions of the units in the direction X are unified, and so are the dimensions in the direction Z. For example, in addition to the above, the dimensions of the units or some of the units in the direction Y may be unified. When units having unified dimensions in the direction Y are rearranged or replaced with others, the possibility of restriction on the rearrangement or the replacement of the units due to the space where the units are installed is therefore further lowered. The dimensions of only some of the units may be unified, or the dimensions of the entire units may not be unified. For example, the dimensions of a plurality of robot units provided in the optional unit 400 in the directions X, Y, and Z may be unified, while the dimensions of other units in the directions X, Y, and Z may not be unified. Also in this case, when units having unified dimensions are rearranged or replaced with others, the possibility of restriction on the rearrangement or the replacement of the units due to the space where the units are installed is lowered.

(I-9) The optional unit 400 may include, for example, units different from the units described in the embodiments described above, or may include a plurality of identical units. The units may not be arranged in a single row, and may be arranged in the shape of the letter L, a cross, or a rectangle when viewed along the direction Z. The apparatuses and other components in each of the units described in the embodiments described above may be disposed in other units. For example, the robot 451 that functions as the material supply robot and the transport robot may be disposed in the main unit 100 or in the member molding unit 500.

(I-10) In the embodiments described above, the first controller 103 provided in the first injection molding machine 101 provides the function of overseeing and controlling the entire injection molding system 5. In contrast, the first controller 103 may not oversee or control the entire injection molding system 5. For example, a controller of an apparatus and other components provided in the optional unit 400 may oversee and control the entire injection molding system 5, or a controller that only oversees and controls the entire injection molding system 5 may be provided. The controller that oversees the entire injection molding system 5 may not be provided. For example, the first controller 103 and the controllers provided in a variety of apparatuses disposed in the optional unit 400 may control the first injection molding machine 101 and the variety of apparatuses by referring to values measured by timers, a variety of sensors, and other components in such a way that the first injection molding machine 101, the variety of apparatuses, and other components operate in conjunction with each other.

J. Other Aspects

The present disclosure is not limited to the embodiments described above and can be achieved in a variety of aspects to the extent that the aspects do not depart from the substance of the present disclosure. For example, the present disclosure can be achieved by the aspects below. The technical features in the embodiments described above that correspond to the technical features in the aspects described below can be replaced by or combined with other technical features as appropriate to solve part or entirety of the problems in the present disclosure or achieve part or entirety of the effects of the present disclosure. Furthermore, when any of the technical features has not been described as an essential feature in the present specification, the technical feature can be deleted as appropriate.

(1) According to a first aspect of the present disclosure, an injection molding unit is provided. The injection molding unit includes a main unit and an optional unit, the main unit accommodating a first injection molding machine that molds an integrated product by injecting a first molding material into a cavity which is defined by a lower die and an upper die and in which an insert member is disposed. The optional unit includes at least one of a member molding unit that accommodates a second injection molding machine that molds the insert member by injecting a second molding material or a press molding machine that molds the insert member in press molding, and a robot unit that accommodates a robot that performs placement operation of placing the insert member in the cavity or transport operation of transporting the integrated product molded by the first injection molding machine. The main unit is so configured that the optional unit is attachable thereto and detachable therefrom.

The aspect described above allows space saving as compared with the case where the units or the apparatuses are separately installed, with the degree of freedom of customization of the injection molding system increased.

(2) In the aspect described above, the first injection molding machine may include an injector that injects the molding material toward the cavity. In a state in which the upper and lower dies are installed in the first injection molding machine, the injector, the upper die, and the lower die may be arranged sequentially from above in the vertical direction. The injector may include a rotating flat screw having a groove forming surface in which a groove is formed, a barrel having a flat screw facing surface facing the groove forming surface and having a communication hole into which the first molding material flows, a heater that heats a material supplied to the space between the groove forming surface and the flat screw facing surface, and a nozzle which communicates with the communication hole and via which the first molding material is injected toward the cavity. The rotation of the flat screw and the heat produced by the heater may plasticize at least part the material to produce the molding material, and feed the first molding material into the communication hole. According to the aspect described above, the size of the first injection molding machine can be reduced in the horizontal direction as compared, for example, with a case where the injector, the upper die, and the lower die are arranged along the horizontal direction, whereby the size of the main unit can be reduced in the horizontal direction. Furthermore, the size of the first injection molding machine can be reduced as compared, for example, with a case where the injector includes an in-line screw in place of a flat screw, whereby the size of the main unit can be reduced. Space saving of injection molding system can therefore be readily achieved. Moreover, the smaller the main unit is, the larger number of optional units or larger optional units can be attached to the main unit, whereby the degree of freedom of customization of the injection molding system can be increased.

(3) In the aspect described above, the first injection molding machine may include a die clamper that perform die clamping and die opening operation of clamping and opening the upper die and the lower die by moving the injector and the upper die along the vertical direction. According to the aspect described above, the integrated product can be removed from the lower die and the insert member can be placed in the lower die in a fixed position in the vertical direction. Therefore, the step of removing the integrated product from the lower die and the step of placing the insert member in the lower die can therefore be more readily automated.

(4) In the form described above, the first injection molding machine may include a first support that supports a first lower die as the lower die, a second support that supports a second lower die as the lower die, and a position changer configured to be capable of moving the first support and the second support. The position changer may move the first lower die or the second lower die to an injection position where the lower die and the upper die face each other by moving the first support and the second support, and switch a first state to a second state and vice versa, the first state being a state in which the first lower die is located in the injection position and the second lower die is located in a position different from the injection position, the second state being a state in which the second lower die is located in the injection position and the first lower die is located in a position different from the injection position. According to the aspect described above, for example, while the integrated product is molded by using one of the lower dies that is located in the injection position, the integrated product can be removed from the other lower die located in the position different from the injection position, and the insert member can be placed in the other lower die. Therefore, in the main unit, the first and second lower dies can be used to efficiently mold the integrated product.

(5) In the aspect described above, the position changer may linearly move the first support and the second support along an intersection direction that intersects with the vertical direction to position the second lower die in a first standby position different from the injection position in the first state and position the first lower die in a second standby position on the side opposite from the first standby position with the injection position sandwiched therebetween in the intersection direction in the second state, and the first injection molding machine may further include a first ejector that removes the integrated product from the second lower die in the first standby position and a second ejector that removes the integrated product from the first lower die in the second standby position. According to the aspect described above, the position changer can readily switch the first state to the second state and vice versa by linearly moving the first and second supports along the direction X. In either the first or second state, the integrated product can be readily removed from the lower dies by using the first or second ejector.

(6) In the aspect described above, the optional unit may include the robot unit, and the robot may place the insert member in the second lower die located in the first standby position and in the first lower die located in the second standby position as the placement operation, or transport the integrated product removed from the second lower die in the first standby position and the integrated product removed from the first lower die in the second standby position as the transport operation. According to the aspect described above, the step of transporting the integrated product removed from one lower die while insert molding is performed by using the other lower die, and the step of placing the insert member in the one lower die in the same manner can be automated. The integrated product can therefore be more efficiently manufactured in the injection molding system.

(7) In the aspect described above, the injection molding unit may include an insert detector that detects whether or not the insert member has been placed in a predetermined insert position in the lower die. According to the aspect described above, the insert detector can be used to detect whether or not the insert member has been placed in the insert position. The aspect described above prevents injection molding from being performed with the insert member placed in a position different from the insert position, and thus prevents damage to the upper and lower dies installed in the first injection molding machine, damage to the injector, and production of defective products.

(8) In the aspect described above, the optional unit may include the robot unit, and the robot may place the insert member in the lower die as the placement operation, and may place the insert member in the insert position in the placement operation based on the result of the detection performed by the insert detector. According to the aspect described above, the robot can adjust the position of the insert member in such a way that the insert member is located in the insert position while placing the insert member in the lower die in the placement operation. The insert member can therefore be placed in the insert position without adjustment of the position of the insert member by using, for example, another robot or an apparatus different from the robot after the placement operation, whereby the integrated product can be more efficiently manufactured in the injection molding system.

(9) In the aspect descried above, the optional unit may include the robot unit and the member molding unit. The robot unit may be disposed in a position adjacent to the main unit, and the member molding unit may be disposed in a position adjacent to the robot unit. The robot may perform, as the placement operation, the operation of placing the insert member molded by the member molding unit in the lower die. According to the form described above, since the robot unit is located in a position adjacent to the main unit and the member molding unit, the robot disposed in the robot unit can efficiently transport the insert member molded by the member molding unit to the lower die installed in the first injection molding machine of the main unit and place the insert member in the lower die. Therefore, in the injection molding system, the step of molding the insert member to the step of molding the integrated product by using the molded insert member can be automated and efficiently carried out, whereby the integrated product can be more efficiently manufactured.

(10) In the aspect described above, the optional unit may include the member molding unit, which accommodates the press molding machine, and the press molding machine may form a plurality of the insert members in a sheet material having the shape of a sheet by punching out part of the sheet material. The aspect described above allows continuous molding of a plurality of integrated products by feeding the sheet material in which the insert members have been formed by the press molding machine from the press molding machine to the first injection molding machine and causing the first injection molding machine to mold the integrated products formed of the first molding material integrated with the insert members formed in the sheet material. The step of molding the insert members to the step of molding the integrated products by using the molded insert members can therefore be efficiently carried out in the injection molding system, whereby the integrated products can be more efficiently manufactured.

(11) According to a second aspect of the present disclosure, a manufacturing system is provided. The manufacturing system includes one or more of the injection molding systems according to the aspect described above, an assembly line that assembles final products each using the integrated product, and transfer sections that each transfer the integrated products from the injection molding systems to the assembly line.

The aspect described above allows space saving as compared with the case where the units or the apparatuses are separately installed, with the degree of freedom of customization of the injection molding system increased. Furthermore, in the manufacturing system, the integrated products manufactured by the injection molding systems can be gathered onto the assembly line, and the final products can be efficiently manufactured.

What is claimed is:

1. An injection molding system comprising:
a main unit that accommodates a first injection molding machine that molds an integrated product by injecting a first molding material into a cavity which is defined by a lower die and an upper die and in which an insert member is disposed, the main unit having a first enclosure housing the main unit and a first base at which the first injection molding machine is located, the first base being rectangular-shaped and extending in first and second directions perpendicular to each other in a plan view; and
an optional unit having a second enclosure housing the optional unit and a second base at which an inner machine is located, the second base being rectangular-shaped and extending in the first and second directions in the plan view,
wherein the optional unit includes at least one of:
a member molding unit that accommodates a second injection molding machine, as the inner machine, that molds the insert member by injecting a second molding material or a press molding machine, as the inner machine, that molds the insert member in press molding; and
a robot unit that accommodates a robot, as the inner machine, that performs placement operation of placing the insert member in the cavity or transport operation of transporting the integrated product molded by the first injection molding machine;
the main unit is so configured that the optional unit is attachable thereto and detachable therefrom by a bolt,
a first length in the first direction of the main unit and a second length in the first direction of the optional unit are the same, and
a first height of the main unit and a second height of the optional unit are the same.

2. The injection molding system according to claim 1, wherein the first injection molding machine includes an injector that injects the first molding material toward the cavity,
in a state in which the upper and lower dies are installed in the first injection molding machine, the injector, the upper die, and the lower die are arranged sequentially from above in a vertical direction,
the injector includes:
a rotating flat screw having a groove forming surface in which a groove formed;
a barrel having a flat screw facing surface facing the groove forming surface and having a communication hole into which the first molding material flows;
a heater that heats a material supplied to a space between the groove forming surface and the flat screw facing surface; and
a nozzle which communicates with the communication hole and via which the first molding material is injected toward the cavity, and
the rotation of the flat screw and heat produced by the heater plasticize at least part the material to produce the first molding material, and feed the first molding material into the communication hole.

3. The injection molding system according to claim 2, wherein the first injection molding machine includes a die clamper, and
the die clamper is configured to perform a die clamping operation and a die opening operation of clamping and opening the upper die and the lower die by moving the injector and the upper die along the vertical direction.

4. The injection molding system according to claim 3, wherein the first injection molding machine includes:
a first support that supports a first lower die as the lower die,
a second support that supports a second lower die as the lower die, and
an actuator configured to move the first support and the second support, and
the actuator is configured to:
move the first lower die or the second lower die to an injection position where the lower die and the upper die face each other by moving the first support and the second support; and
switch a first state to a second state and vice versa, the first state being a state in which the first lower die is located in the injection position and the second lower die is located in a position different from the injection position, the second state being a state in which the second lower die is located in the injection position and the first lower die is located in a position different from the injection position.

5. The injection molding system according to claim 4, wherein the actuator is further configured to linearly move the first support and the second support along an intersection direction that intersects with the vertical direction to position the second lower die in a first standby position different from the injection position in the first state and position the first lower die in a second standby position on a side opposite from the first standby position with the injection position sandwiched therebetween in the intersection direction in the second state, and the first injection molding machine further includes a first ejector that removes the integrated product from the second lower die in the first standby position and a second ejector that removes the integrated product from the first lower die in the second standby position.

6. The injection molding system according to claim 5, wherein the optional unit includes the robot unit, and the robot is configured to:
place the insert member in the second lower die located in the first standby position and place the insert member in the first lower die located in the second standby position as the placement operation; or
transport the integrated product removed from the second lower die in the first standby position and transport the integrated product removed from the first lower die in the second standby position as the transport operation.

7. The injection molding system according to claim 2, further comprising a controller configured to detect whether or not the insert member is placed in a predetermined insert position in the lower die.

8. The injection molding system according to claim 7, wherein the optional unit includes the robot unit, and the robot is configured to:
place the insert member in the lower die as the placement operation; and
place the insert member in the insert position in the placement operation based on a result of the detection performed by the controller.

9. The injection molding system according to claim 1, wherein the optional unit includes the robot unit and the member molding unit,
the robot unit is disposed in a position adjacent to the main unit,
the member molding unit is disposed in a position adjacent to the robot unit, and
the robot is configured to perform the placement operation to place the insert member molded by the member molding unit in the lower die.

10. The injection molding system according to claim 1, wherein the optional unit includes the member molding unit, which accommodates the press molding machine, and
the press molding machine forms a plurality of the insert members in a sheet material having a shape of a sheet by punching out part of the sheet material.

11. A manufacturing system comprising:
one or more of the injection molding systems according to claim 1;
an assembly line that assembles final products each using the integrated product; and
transfer sections that transfer the integrated products from the one or more injection molding systems to the assembly line.

* * * * *